(12) United States Patent
Huo et al.

(10) Patent No.: US 6,282,305 B1
(45) Date of Patent: Aug. 28, 2001

(54) METHOD AND SYSTEM FOR THE COMPUTERIZED ASSESSMENT OF BREAST CANCER RISK

(75) Inventors: Zhimin Huo, Chicago; Maryellen L. Giger, Elmhurst, both of IL (US)

(73) Assignee: Arch Development Corporation, Chicago, IL (US)

( * ) Notice: Subject to any disclaimer, the term of this patent is extended or adjusted under 35 U.S.C. 154(b) by 0 days.

(21) Appl. No.: 09/092,004

(22) Filed: Jun. 5, 1998

(51) Int. Cl.[7] .................................................. G06K 9/00
(52) U.S. Cl. .......................... 382/128; 382/133; 600/300
(58) Field of Search .............................. 382/128, 133, 382/156, 160; 600/300; 435/29; 128/923, 915

(56) References Cited

U.S. PATENT DOCUMENTS

| | | | |
|---|---|---|---|
| 5,003,979 | * 4/1991 | Merickel et al. | 128/653 A |
| 5,642,936 | * 7/1997 | Evans | 128/630 |
| 5,733,739 | * 3/1998 | Zakim et al. | 435/29 |
| 5,800,347 | * 9/1998 | Skates et al. | 600/300 |

OTHER PUBLICATIONS

Doi et al., "Digital Mammography '96—Proceedings of the 3rd International Workshop on Digital Mammography, Chicago, U.S.A., Jun. 12, 1996" 1996 Elsevier Science B.V., pp. 191–194.

* cited by examiner

Primary Examiner—Matthew C. Bella
(74) Attorney, Agent, or Firm—Oblon, Spivak, McClelland, Maier & Neustadt, P.C.

(57) ABSTRACT

A method, system and computer readable medium for the computerized assessment of breast cancer risk, wherein a digital image of a breast is obtained and at least one feature, and typically plural features, are extracted from a region of interest in the digital. The extracted features are compared with a predetermined model associating patterns of the extracted features with a risk estimate derived from corresponding feature patterns associated with a predetermined model based on gene carrier information or clinical information, or both gene carrier information and clinical information, and a risk classification index is output as a result of the comparison. Preferred features to be extracted from the digital image include 1) one or more features based on absolute values of gray levels of pixels in said region of interest, 2) one or more features based on gray-level histogram analysis of pixels in said region of interest; 3) one or more features based on Fourier analysis of pixel values in said region of interest; and 4) one or more features based on a spatial relationship among gray levels of pixels within the region of interest.

66 Claims, 14 Drawing Sheets

Original Breast Image

**Selected ROI
256 pixels x 256 pixels**

METHOD AND SYSTEM FOR THE COMPUTERIZED ASSESSMENT OF BREAST CANCER RISK

STATEMENT REGARDING FEDERALLY SPONSORED RESEARCH

The present invention was made in part with U.S. Government support under grant numbers NIH RR 1 1459 and P20 CA66132 from the USPHS, and grant number DAMD 19-96-1-6058 from the US Army Medical Research and Material Command. The U.S. Government has certain rights in the invention.

CROSS-REFERENCE TO RELATED APPLICATIONS AND PUBLICATIONS

The present is related to automated techniques for automated detection of abnormalities in digital images, for example as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,790,690; 5,832,103; 5,873,824; 5,881,124; 5,931,780; 5,974,165; 5,982,915; 5,984,870; 5,987,345; as well as U.S. application Ser. Nos. 08/173,935; 08/398,307; 08/536,149; 08/562,087; 08/900,188; 08/900,189; 08/900,191; 08/979,623; 08/979,639; 08/982,282; 09/028,518; 09/027,685; and 09/053,798 each of which are incorporated herein by reference in their entirety.

The present invention also relates to technologies referenced and described in the references identified in the appended APPENDIX and cross-referenced throughout the specification by reference to the number, in brackets, of the respective reference listed in the APPENDIX, the entire contents of which are also incorporated herein by reference. Various of these publications may correspond to various of the cross-referenced patents and patent applications.

BACKGROUND OF THE INVENTION

1. Field of the Invention:

The invention relates generally to a method and system for computerized assessment of breast cancer risk.

Breast cancer risk assessment provides an opportunity to devise appropriate surveillance plans that may include enhanced screening for women at increased risk of breast cancer. Computerized analysis of mammographic parenchymal patterns may provide an objective and quantitative characterization and classification of these patterns, which may be associated with breast cancer risk. Computerized assessment of breast cancer risk based on the analysis of mammograms alone or combined with epidemiologic risk factors (for example, age) may serve as an alternative to current existing clinical methods, which are costly and/or information-dependent, in predicting breast cancer risk.

2. Discussion of the Background:

The breast is composed primarily of two components, fibroglandular tissue and fatty tissue. The average breast consists of 50% fibroglandular tissue and 50% fat. Fibroglandular tissue is a mixture of fibrous connective tissue and the glandular epithelial cells that line the ducts of the breast (the parenchyma). The major breast diseases develop from the terminal ductal lobular units of the breast, and arise predominantly from the epithelial cells that line the ducts; however, the fibrous or connective tissue can also be involved. It is thought by most experts that malignant breast disease develops through a process that starts with epithelial hyperplasia, i.e., an increase in the number of epithelial cells. Epithelial hyperplasia can progress to atypical hyperplasia in which the epithelial cells not only increase in number, but also change in a way that is not normal for these cells. The process, at this stage, is believed to be reversible. Once a certain criterion level of atypia is reached, the diagnosis of carcinoma-in-situ can be made, in which there is no invasion of malignant cells outside of the duct. The process of malignant transformation is considered irreversible at this stage. In the last phase of development, the cancer cells break out of the ductal walls and invade the surrounding stromal tissue, and at this point the disease is called infiltrating or invasive carcinoma. Most (80%–85%) breast carcinomas can be seen on a mammogram as a mass, a cluster of tiny calcifications, or a combination of both. Other mammographic abnormalities are of lesser specificity and prevalence than masses and/or calcifications, and include skin or nipple changes, abnormalities in the axilla, asymmetric density, and architectural distortion.

Early detection of breast cancer can improve survival rates. The overall five-year survival rate for women diagnosed with breast cancer is 84%, but when found at a small, localized stage, the 5-year survival rate is 97% [1]. Studies show that use of screening mammography can reduce lesion size and stage at detection, improving the prognosis for survival. Currently, mammography is a well-established imaging technique for early detection of breast cancer. Annual screening mammography is recommended by the American Cancer Society for all women over the age of 40 [1].

Clinical acquisition of x-ray mammograms is a rather complicated procedure and requires specific techniques in order to obtain high quality images. Attenuation differences between various structures within the breast contribute to image contrast. Due to the similar composition of breast structures and the physical manifestations of breast carcinoma, screen-film mammographic imaging must be substantially different from general radiographic imaging. Low-energy x-rays are required to enhance the ability to differentiate between normal tissues and carcinoma. The radiological appearance of the breast varies between individuals because of variations in the relative amounts of fatty and fibroglandular tissue. Since fat has a lower effective atomic number than that of fibroglandular tissue, there is less x-ray attenuation in fatty tissue than in fibroglandular tissue. Fat appears dark (i.e., higher optical density) on a mammogram, while fibroglandular tissue appears light (i.e., lower optical density) on a mammogram. Regions of brightness associated with fibroglandular tissue are normally referred to as "mammographic density".

Screening mammography typically includes two standard radiographic projections, medio-lateral oblique (MLO) and cranio-caudal (CC), that are taken of each breast (right and left) for a total of four images. The purpose of these two views is to completely image the breasts and, if any lesions are present, allow localization and preliminary characterization.

Breast cancer risk assessment provides an opportunity to devise appropriate surveillance plans that may include enhanced screening for women at increased risk of breast cancer. Computerized analysis of mammographic parenchymal patterns may provide an objective and quantitative characterization and classification of these patterns, which may be associated with breast cancer risk. Computerized assessment of breast cancer risk based on the analysis of mammograms alone or combined with epidemiologic risk factors (for example, age) may serve as an alternative to current existing clinical methods, which are costly and/or information-dependent, in predicting breast cancer risk.

As the best method for early detection of breast cancer, annual screening mammography has been recommended for women over 40 years of age [1]. Mammographic surveillance for women under age 40 years who are at very high risk of developing breast cancer, however, still remains an issue, since the benefit of screening women in this age group has not been proven. Women at high risk of developing breast cancer tend to develop breast cancer at a younger age [2]. Identification and close follow-up of these high-risk women may provide an opportunity for early breast cancer detection. Thus, computerized methods that are capable of assessing breast cancer risk may allow women and their physicians to devise an individualized surveillance plan that may include enhanced screening for women at high risk for early detection of breast cancer. These plans may lead to improvements in the overall efficacy of screening mammography for early detection of breast cancer. Further, knowledge of which women are at high risk of developing breast cancer has important implications in the study of breast cancer.

There are two widely used methods to measure risk: relative risk and absolute risk [16]. Relative risk is defined as the ratio of age-specific breast cancer incidence rate among women with specific risk factors to the incidence rate among women without known risk factors. Relative risk estimates are useful for measuring the relative magnitude of effect of a given risk factor as a population risk. However, relative risk estimates do not directly approximate the underlying probability of a diagnosis of breast cancer for an individual over time.

Absolute risk (or cumulative risk) is defined as the probability that a woman with given risk factors and given age will develop breast cancer over a defined time period. Absolute risk estimates give women a realistic and individualized estimate of the chance of developing cancer over various time horizons. An assessment of cumulative risk over different periods of time can help a woman understand the extent of her risk and therefore, can be useful in helping the woman and her doctor define an acceptable surveillance plan for the future.

For decades, it has been known that all breast cancers are genetic, i.e., the development of breast cancer is the result of alteration of chromosomal DNA through mutation or damage with the resultant loss of normal growth regulation [5]. Sporadic breast cancer results from somatic changes that are specific to the tumor cells, i.e., the epithelial cells of the breast, which are not found in other cells of the patient. Recent molecular studies demonstrate that breast cancer may be inherited [2,6,7]. In a landmark article published in 1990, King et al. used genetic linkage analysis to identify a gene named BRCA1 (breast cancer 1), which was found to be responsible for the breast cancer diagnosed in women who inherited a mutated form of the BRCA1 gene in all cells (germline mutation) at birth. Since then, four other genes responsible for breast cancer, including the BRCA2 (breast cancer 2) gene, have been identified [8]. In general. hereditary breast cancer appears earlier than purely sporadic breast cancer, because among women with inherited susceptibility, one of the cancer-causing mutations is present from birth. Thus, fewer somatic mutations specific to breast cancer cells need to occur.

It is estimated that women who inherit a mutated form of the BRCA1 gene have as much as a 20% risk of developing breast cancer by age 40 years, a 33%–73% risk of developing breast cancer by age 50 years, and an 56%–87% risk of developing breast cancer by age 70 years [9,10], which is about up to 8 times higher than the lifetime risk for the general population. The recent isolation of BRCA1 and BRCA2, and the acknowledgment that additional breast cancer susceptibility genes may exist, provides a molecular basis for counseling some high-risk women.

Although the evidence of familial aggregation of breast cancer suggests that there is an important hereditary component, there are many families in which breast cancer (familial breast cancer) has appeared more than once purely by chance and not as the result of inherited susceptibility. Studies show that truly hereditary breast cancers accounts only for 5%–10% of all breast cancers [11,12], and most breast cancers occur sporadically and are likely the result of random events on the cellular level. In addition to age, many factors have been identified to be related to breast cancer risk. However, the basic mechanism underlying the association between breast cancer and these risk factors is not well understood. It has been recognized for some time that varying levels of endogenous and erogenous estrogens have been associated with the risk of developing breast cancer. Higher levels of endogenous hormones, in particular estrogens, are an important factor in the etiology of breast cancer [13,14].

Risk factors for breast cancer can be classified broadly as being of either personal or environmental origin. Personal risk includes aspects of individual biological histories, such as family history of breast cancer, reproductive history, menopausal status, and breast disease history. Environmental risk factors are exogenous influences, such as diet and exposure to environmental carcinogens. Table 1 lists factors identified on the basis of large epidemiologic studies and that have a strong or well-established association with breast cancer. [3]

TABLE 1

Selected factors for breast cancer risk.

| Factor | Comparison group | Approximate relative risk |
|---|---|---|
| Age | | |
| 40–44 | Age 25–29 | 16 |
| 50–54 | | 28 |
| 60–64 | | 44 |
| 70–74 | | 56 |
| Western country | Japan | 5 |
| Family history of breast cancer | | |
| One affected first-degree relative | No affected first-degree relative | 1.4–3 |
| Two or more affected first-degree relatives | | 4–6 |
| Early age (30 yrs old) of onset in affected relative | Age 50 | 2.6 |
| Reproductive history | | |
| Age at menarche, II | Age 16 | 1.3 |
| Age at first live birth | | |
| 20–24 | <20 | 1.3 |
| 25–29 | | 1.6 |
| >30, nulliparous | | 1.9 |
| Age at menopause | | |
| After 55 | Age 45–55 | 1.5 |
| Before 45 | | 0.7 |
| Evidence of breast pathology | | |
| Any benign disease | No biopsy or aspiration | 1.5 |
| Proliferative disease | | 2 |

TABLE 1-continued

Selected factors for breast cancer risk.

| Factor<br>Age | Comparison<br>group | Approximate<br>relative risk |
|---|---|---|
| Atypical hyperplasia | | 2–4 |
| History of cancer in contralateral breast | No history of cancer | 5 |
| Percent dense parenchyma on mammography | | |
| 5%–24.9% | <5% dense regions | 1.7 |
| 25%–44.9% | | 2.5 |
| 45%–64.9% | | 3.8 |
| >65% | | 4.3 |
| Exposures | | |
| Radiation, 100 rads | No special exposure | 3 |
| Alcohol, two drinks/day | Nondrinker | 1.7 |

Among these risk factors, age has been identified as the single most important risk factor for the development of breast cancer in women. The incidence of breast cancer increases with age. Studies show that diagnosis of breast cancer is rare before age 25 years [15]. The incidence of breast cancer increases rapidly between the ages of 25 and 44. Near the age of menopause, the rate of increase in incidence for successive age groups is slower compared with the observations in premenopausal women. In addition to age, risk factors such as family history of breast cancer, personal history of breast cancer, biopsy-confirmed benign proliferative breast disease, and age at first live birth and at menarche have been identified and have been used in clinical risk prediction models [3,4,16] to estimate an individual's risk of developing breast cancer.

Increased mammographic density is another factor that has been found to be associated with an increased risk of breast cancer. It has been shown in several studies that women with increased mammographic parenchymal density are at a four- to six-fold higher risk over women with primarily fatty breasts [17–22]. At present, the reason for this increased risk is unclear. One possibility is that increased density reflects a larger amount of tissue at risk for developing breast cancer. Since most breast cancers develop from the epithelial cells that line the ducts of the breast, having more of this tissue as reflected by increased mammographic density may increase the chances of developing breast cancer.

In the inventors' study, the Gail and the Claus models were used to estimate individual risk over a woman's lifetime (up to 79 years old) and during the next 10 years of her lifetime, which are referred to as the lifetime risk and the 10-year risk of developing breast cancer.

The Gail model [25] was developed based on case-control studies involving 2,852 white women with incident breast cancer and 3,146 white controls selected from the Breast Cancer Detection Demonstration Project (BCDDP) population data. The risk factors used in the Gail model are age, age at menarche, age at first live birth, number of previous breast biopsies, number of first-degree relatives with breast cancer and history of biopsy with hyperplasia [3,25]. These risk factors are broadly consistent with those selected from other large population-based studies [3]. Because the Gail model was developed from a database which includes only white women who tend to return for annual mammographic screening [3], it is anticipated that this model would over-predict risk in younger, unscreened women since the BCDDP population had a higher prevalence of women with adverse risk factors than the general population [3,25].

The Claus model [4] was derived from the Cancer and Steroid Hormone (CASH) Study, which was a multicenter, population-based, case-control study. The data consists of 4730 patients with histologically confirmed breast cancer, age 20–54 years, and 4688 control subjects. The control subjects were frequency-matched to patients according to geographic region and 5-year categories of age. The aim of the study conducted by Claus et al. differs from that of Gail et al. in that Claus et al. intended to address the issue of risk calculation solely for a subset of women who are at potentially high risk for breast cancer, i.e., women with a family history of breast cancer. For these women, it appears that the number and the type of relatives affected with breast cancer as well as the ages at onset of any affected relative may be the most important risk factors, more so than risk factors such as age at first live birth or age at menopause that are used in the Gail model. Claus et al. found in their data that risk of individuals increased as "age at onset" of their affected relatives decreased [4]. On the other hand, Gail et al. did not find, in their data, that age at onset was helpful in the prediction of risk once the number of relatives affected was considered [3,25].

Because the risk factors used in the Gail model are more consistent with those selected from other studies, the Gail model was able to be validated on other large databases. Validation studies [27,28] have shown that the Gail model predicts risk most accurately in women who undergo yearly mammographic screening and overpredicts risk for women who do not undergo yearly mammographic screening. Another validation study, which involved 109,413 women from the Nurses' Health Study, showed that the correlation coefficient between observed risk from the database and predicted risk from the Gail model was 0.67 [28]. These validation studies demonstrated that. for accurate estimation, the Gail and Claus models should be applied only to a population similar to those from which the models were derived.

With the increasing awareness of breast cancer risk and the benefit of screening mammography, more women in all risk categories are seeking information regarding their individual breast cancer risk. The need exists for primary care clinicians to be able to assess an individual's risk of developing breast cancer and offer an appropriate surveillance program for each individual [23,24]. Identification and close surveillance of women who are at high risk of developing breast cancer may provide an opportunity for early cancer detection.

Breast cancer risk assessment is an emerging service which includes determination of risk, recommendations for surveillance, and counseling for women at elevated risk. Currently, several prediction models based on large epidemiologic studies [16] have been developed to predict risk using known risk factors such as a woman's age, her family and personal histories of breast cancer, and gynecological information. Among them, the Gail model and the Claus model are the most commonly used for prediction of an individual's breast cancer risk [23]. These models are used by clinicians for counseling women who are seeking information regarding their individual breast cancer risk. The Gail model was used to identify women at high risk for the entry to the Tamoxifen Prevention Trial. Recently, Offit and Brown [16] reviewed four major models of risk prediction and provided a comparison of the different models. Since each of these models was derived with a different study design and used different factors to calculate risk, risk estimates for a given individual obtained from each of the models differed slightly. It was anticipated and confirmed that these models, which use a few selected risk factors, only predict risk accurately for the populations similar to those from which the models were developed [3,4,25–28]. Clinicians have been instructed to select models carefully since each of these models was designed based on a particular population. Further, the risk predicted from these models must be justified according to clinical observations since information such as a positive result from a DNA test for the BRCA1/BRCA2-mutation supersedes routine projections from a model [23,26].

Nevertheless, the models provide an epidemiologic basis for risk prediction and serve as guidelines for counseling patients until more refined predictions based on molecular characterization or other methods become available.

Over the past twenty years, the association of breast cancer risk with mammographic parenchymal patterns has been investigated. In 1976, Wolfe first described an association between risk for breast cancer and different mammographic patterns [86]. He described four patterns of breast parenchyma (N1, P1, P2, and DY) associated with different risk levels of developing breast cancer. An N1 (lowest risk) pattern indicates a breast in which the breast is composed entirely of fat tissue. P1 (high risk) and P2 (high risk) patterns refer to increasing ductal prominence (a P1 pattern consists of ducts occupying less than 25% of the breast and a P2 pattern consists of ducts occupying more than 25% of the breast). A DY pattern (highest risk) refers to a breast which is largely occupied by diffuse or nodular densities. Many investigators have used Wolfe patterns to classify the mammographic appearance of breast parenchyma for risk prediction [30]. Others have used qualitative or quantitative estimates of the proportion of the breast area (percent density) that mammographically appears dense to assess the associated breast cancer risk.

Since Wolfe's work, interest in the possible association of mammographic parenchymal patterns with breast cancer has varied [31–33]. Wolfe's initial reports were landmark studies in this field. However, the results provoked various criticisms, for example, possible bias in the results due to the "masking" effect. Studies showed that breast cancer was most easily detected by mammography in fatty breasts and was most difficult to detect in breasts with dense parenchyma, thus there were more cancers missed by mammography in women with dense breasts [34]. The hypothesis of the "masking effect" [31] said that the observed greater risk of breast cancer in women with dense breasts was due to the fact that these missed cancers in the dense breast at the initial classification declared themselves on subsequent follow-up.

Several groups [20,35] have conducted experiments to examine the masking hypothesis. Whitehead et al. [35] examined the masking hypothesis by using data from the Breast Cancer Detection and Demonstration Project (BCDDP). They found that the masking of cancer did occur in breasts with dense parenchyma; however, their results showed that the effect of the masking on estimation of breast cancer risk was small. They concluded that women with dense breasts have two disadvantages: 1) they were at increased risk of developing breast cancer, and 2) cancers occurring in dense breast parenchyma were more difficult to detect.

During the time of this controversy, many investigators studied the relationship between the mammographic patterns and breast cancer risk using the Wolfe method or percent density methods. Considerable variations were observed in reported results. In 1992, Warner et al. [30] carried out a meta-analysis using 35 publications to examine the effect of different methods on the assessment of breast cancer risk. They grouped the studies according to their designs and methods used, and determined the magnitude of the risk of breast cancer associated with mammographic density for the studies in each group. They found that the estimated relative risk of developing breast cancer depended on the methods that were used to classify mammographic patterns and ranged from 0.53 to 5.19. Based on the meta-analysis, they concluded that women with dense breasts have an increased risk of breast cancer relative to those with fatty breasts.

While visual assessment of mammographic patterns has remained controversial due to the subjective nature of human assessment [36], computer vision methods can yield objective measures of breast density patterns. Computerized techniques have been investigated to quantitatively evaluate mammographic parenchyma and identify women that are at risk of developing breast cancer. Computerized density analysis of mammographic images has been investigated by various investigators including Magnin et al. [37], Caldwell et al. [38], Taylor et al. [39], Tahoces et al. [40], and Byng et al. [41,42].

Magnin et al. [37] tried to classify mammograms into four categories (Wolfe patterns) using texture parameters extracted from co-occurrence matrices, the spatial gray level dependence method (SGLDM), and the gray level difference method (GLDM). They claimed that their result was inconclusive because a limited number of cases (27 mammograms) were used and the quality of the images used in the study was poor [37]. Caldwell et al. [38] used fractal dimension analysis to classify mammograms into the four patterns described by Wolfe, yielding 84% agreement with that of radiologists. Tahoces et al. [40] investigated the ability of linear discriminant analysis to quantify Wolfe patterns by merging texture measures obtained from Fourier transform method, local contrast analysis, and gray-level distribution. Their results showed that agreement (22%–77%) among radiologists and the computer classification varied depending on the Wolfe patterns. Taylor et al. [39] used local a skewness measure to separate fatty and dense breasts, yielding 85% classification accuracy for 106 mammograms. Byng et al. [41,43] investigated a semi-automated interactive thresholding technique based on visual assessment and computerized texture analysis (a local skewness measure and fractal dimension analysis) to quantify the percent density of breasts. Their results showed that computerized assessment of mammographic density using the texture measures ®=–0.60) correlated well with the visual assessment (subjective classification) of the projected area of mammographically dense tissue. Furthermore, they showed that increased mammographic density was associated with an increased relative risk by a factor of 2 to 4. Their results also showed that the relative risk estimates obtained using the two computer-extracted texture measures were not as strong as those from their subjective mammographic classification method.

Development of a computerized method to automatically extract features that characterize mammographic parenchymal patterns and relate to breast cancer risk would potentially benefit women seeking information regarding their individual breast cancer risk. In this study, 14 computer-extracted texture measures were used to characterize mammographic parenchymal patterns. Selected texture measures were then related to breast cancer risk via two different approaches. i.e., First, these measures were used to differentiate mammographic parenchymal patterns of BRCA1/BRCA2 -mutation carriers from those of women who are at low risk of developing breast cancer and then they were used to predict breast cancer risk as determined from the Gail or Claus model.

SUMMARY OF THE INVENTION

Accordingly, an object of this invention is to provide a method and system for assessing breast cancer risk in medical images.

Another object of this invention is to provide an automated method and system for the extraction of features from a region related to either amount of dense parechmymal pattern as present on a mammogram or pattern type such as coarseness.

Another object of his invention is to provide an automated method and system for the merging of features from regions on medical images in order to determine an estimate of breast cancer risk.

Another object of his invention is to provide an automated method and system for relating computerized measures to risk by use of known clinical models such as Gail and Claus models.

Another object of his invention is to provide an automated method and system for relating computerized measures to risk by use of known states of gene mutation.

These and other objects are achieved according to the invention by providing a new and improved automated method, system and computer readable medium for the computerized assessment of breast cancer risk, wherein a digital image of a breast is obtained and at least one feature, and typically plural features, are extracted from a region of interest in the digital. The extracted features are compared with a predetermined model based on gene carrier information or clinical information, or both gene carrier information and clinical information, and a risk classification index is output as a result of the comparison. Preferred features to be extracted from the digital image include 1) one or more features based on absolute values of gray levels of pixels in said region of interest, 2) one or more features based on gray-level histogram analysis of pixels in said region of interest; 3) one or more features based on Fourier analysis of pixel values in said region of interest; and 4) one or more features based on a spatial relationship among gray levels of pixels within the region of interest. In performing the comparison of extracted features with the model, at least one of linear discriminant analysis, linear regression analysis and logistic regression analysis is performed on plural extracted features and/or clinical information pertaining to the person from which the digital image was derived, in conjunction with said predetermined model. In one embodiment, extracted features are merged into a measure related to the risk of acquiring cancer by applying the extracted features as inputs to a trained artificial neural network outputting a risk classification index indicative of risk of acquiring cancer.

The present invention thus involves the development of a computerized method to automatically extract features that characterize mammographic parenchymal patterns and relate to breast cancer risk would potentially benefit women seeking information regarding their individual breast cancer risk. In derivation of the present invention, 14 computer-extracted texture measures are identified to characterize mammographic parenchymal patterns. Selected texture measures derived from the mammograms of patient are then related to breast cancer risk via two different approaches. First, these measures were used to differentiate mammographic parenchymal patterns of BRCA1/BRCA2 -mutation carriers from those of women who are at low risk of developing breast cancer and then they were used to predict breast cancer risk as determined from the Gail or Claus model.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
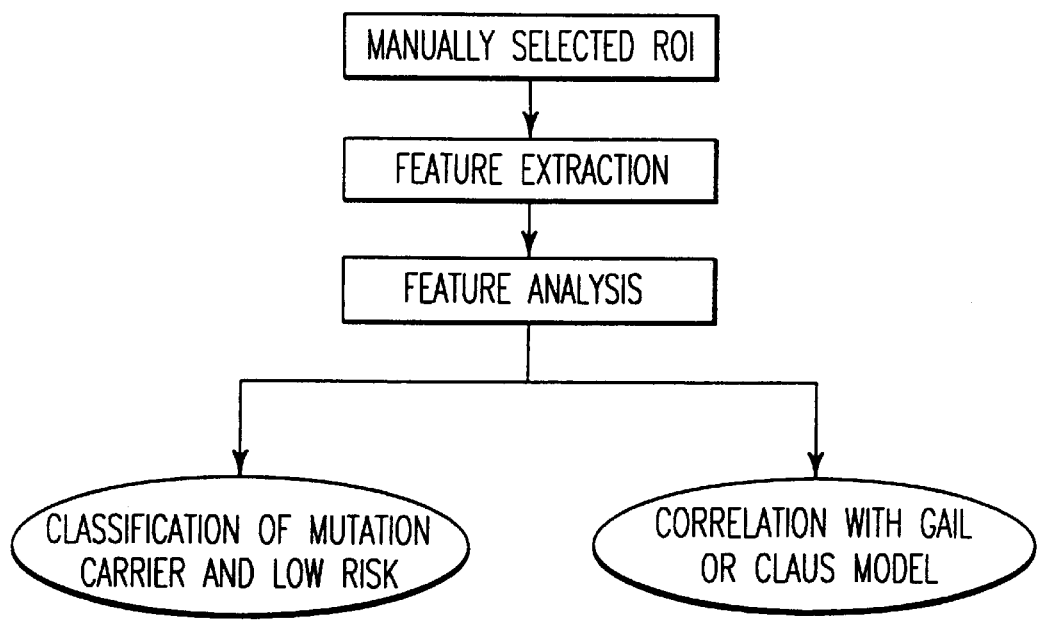
FIG. 1 is a block diagram of an overview of the computerized scheme for breast cancer risk assessment of the present invention.

Referring now to the drawings, and more particularly to FIG. 1 thereof, a schematic diagram of the automated method for the segmentation and/or discrimination of lesions in medical images is shown.

Figure 2A:
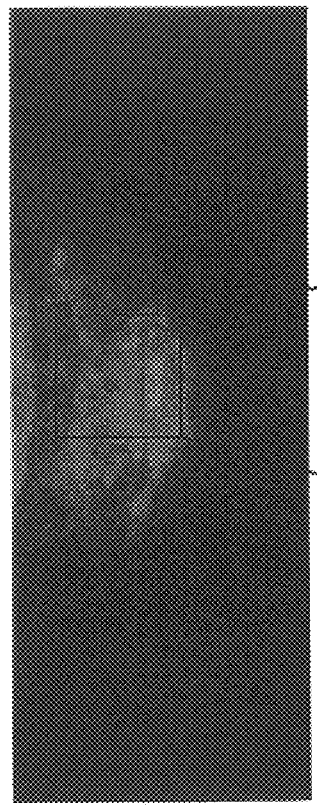
FIG. 2 is a breast image (cranial-caudal view) and a selected ROI of the breast image.
Figure 2B:
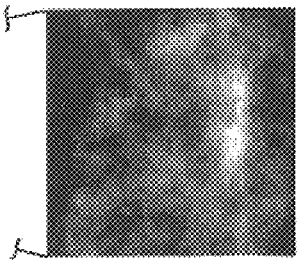

FIG. 1 schematically outlines the computerized method for the assessment of breast cancer risk based on the analysis of mammographic parenchymal patterns. After the mammograms were in digital format (pixel size of 0.1 mm), regions-of-interest (ROIs), 256 pixels by 256 pixels in size, were manually selected from the central breast region (immediately behind the nipple). FIG. 2 illustrates an example of an ROI selected from the breast image. The small ROI size (256 pixels by 256 pixels) was chosen in order to include small-size breasts as shown in FIG. 2 in the study. It should be noted that the dark area along the skin line which contains subcutaneous fat was not included in the ROIs. Various features were then extracted to evaluate the variation of texture patterns within an individual's mammogram.

The analysis was performed only on the ROI selected from one of the four mammographic views (MLO and CC views of left and right breasts) obtained for each patient, namely, the left CC view. We have studied whether the mammographic characteristics as described by the computer-extracted texture measures from a single image are representative and sufficient for the estimation of breast cancer risk. In this study, the correlation of each individual texture measure (a total of 14) extracted from the two projections (CC and MLO views) of the same breast (left) and the correlation of each individual features extracted from the same projection (CC view) of the left breast and the right breast were evaluated. In our database of 356 cases (1095 images), the correlation coefficients of the 14 features ranged from 0.66 to 0.85 between images from CC and MLO views of the left breast and from 0.61 to 0.78 between images from CC views of the left and right breasts. Byng et al. have studied the left-right symmetry and projection (MLO vs. CC view) symmetry of two computer-extracted texture measures (skewness and fractal dimension) [51]. In a database of 30 cases (90 images), they found that the correlation coefficients for the two measures ranged from 0.86 to 0.93. Results from their study and ours indicate that a representative characterization of mammographic texture patterns can be obtained from analyses of a single projection of one of the breasts.

The ROIs selected from the central breast region behind the nipple were used for this study, because they usually include the most dense parts of the breast. It should be noted that in this study a constant ROI size was used for all breast images regardless of breast size.

The ability of the features to predict the risk of developing breast cancer for each individual was evaluated using two methods: 1) ability of individual features as well as a combination of selected features to classify women as either BRCA1/BRCA2-mutation carrier or "low risk", and 2) correlation of combined features with risk (both lifetime risk and 10-year risk) as estimated from the Gail model or Claus model. Multivariate statistical methods including linear regression analysis, linear discriminant analysis and artificial neural networks, were employed to incorporate selected features into models for risk prediction. Correlation and classification analyses were employed to relate these mammographic features with the estimated risk of developing breast cancer. In the classification approach, ROC analysis was employed to evaluate the performance of these features in classifying women as either BRCA1/BRCA2-mutation carriers or "low-risk". In the correlation approach, the goodness of fit (R2) was used to indicate the usefulness of the features in predicting the risk estimated from either the Gail model or the Claus model.

The cases in the study were retrospectively collected and categorized into low risk, high risk and BRCA1/BRCA2 mutation carriers. Mammograms and information regarding gynecological, reproductive and family histories (see list below) were collected from the University of Chicago Cancer Risk Clinic (CRC). The CRC is a coordinated multidisciplinary effort devoted to the identification and care of individuals with any condition or circumstance associated with an increased risk of cancer. The items of information listed are required by the Gail model and/or Claus model in the calculation of individual risk. Pedigree information and/or related biological specimens, such as blood samples, were collected by the CRC for cases with a strong family history of breast cancer. Both the lifetime risk and 10-year risk were calculated for each case using the Gail model and the Claus model by the CRC. Information required by the calculation of the Gail and/or Claus models [3,4]

age number of first-degree relatives with breast cancer age at menarche age at first full-term birth number of benign biopsies number of first-degree relatives with breast cancer and their ages of onset number of second-degree relatives with breast cancer and their ages of onset In the course of collecting the database, a mechanism was instituted to capture the clinical information on women undergoing routine screening mammograms at the University of Chicago hospital (May, 1996 to December. 1996). To be considered low risk in the study, cases had to have no family history of breast cancer and the risk of developing breast cancer for the cases as estimated from the Gail model had to be less than 10%. The problem with this approach is that a few women in the "low-risk" group may develop breast cancer as a result of "new" BRCA1/BRCA2-mutation. It is estimated that one in 200 women—600,000 women in the United States today—have inherited susceptibility to breast cancer [11,12]. The likely prior probability that the women in our "low-risk" group would harbor BRCA1/BRCA2-mutations is low enough that genetic testing was not warranted and they were regarded as low risk without having to perform genetic testing.

The University of Chicago Cancer Risk Clinic has a mechanism to recruit women who are at high risk. To be considered "high risk", cases must have a family history of breast cancer which could include any of the following scenarios: i) one or more first-degree relatives with breast cancer under age 50: ii) two or more second- and third-degree relatives with breast cancer under age 50; or iii) one or more first-degree relatives with ovarian cancer at any a-e plus one case of breast cancer under age 50 in the family. For all patients meeting the above criteria who agreed to participate, a family history interview was conducted as part of ongoing studies in the CRC. After completion of construction of the pedigrees, detailed data on all female relatives who had ever had mammograms and who were willing to participate were collected by the CRC. In families with hereditary breast and ovarian cancer syndromes, participants who had had genetic testing (from elsewhere) were specially recruited into the study as the genetic tests are expensive and only offered to a limited population. Careful pedigree analyses were performed to determine the heterogeneity of familial breast cancer syndromes and to identify women who are likely to benefit from DNA testing. The CRC offered the DNA tests (under research guidelines) to these identified "truly high risk" participants based on the carefully constructed pedigrees combined with clinical information on all relatives.

A total of 392 participants from the routine screening program and the CRC were recruited for the mammographic risk assessment study. Among them, 295 cases were obtained from the screening program. Ninety-seven, including 27 BRCA1/BRCA2-mutation carriers, were recruited from the CRC. Retrospective mammograms were collected for all participants. The analysis of mammographic risk assessment was restricted to cases i) with no breast cancer, except the BRCA1/BRCA2 -mutation carriers, ii) with mammograms obtained in 1989 and afterward, and iii) with mammograms that were taken at least a year before the cancer was diagnosed if the case was a BRCA1/BRCA2 -mutation carrier with breast cancer. The requirements for the mammograms on which the analysis was performed were chosen to i) limit the effect of differences in the imaging techniques on the study results (as modem imaging systems in mammography were introduced to most clinics by 1989), and ii) exclude mammograms containing breast cancers.

A total of 15 BRCA1/BRCA2 -mutation carriers, who met the above criteria, were included in this analysis. Among the 15 qualified BRCA1/BRCA2 -mutation carriers, four had no cancer: two were diagnosed with ovarian cancer; and nine were diagnosed with breast cancer. A radiologist experienced in mammography reexamined the mammograms (obtained at least a year before cancer was diagnosed) of the nine BRCA1/BRCA2-mutation carriers who had breast cancer. No apparent abnormalities were found on these mammograms.

Overall, based on the above criteria, the database used in the computerized mammographic analysis included 143 "low-risk" cases, 222 high/moderate-risk cases, and 15 BRCA1/BRCA2-mutation carriers.

Computer-Extracted Features

A total of 14 features were extracted from each of the selected ROIs to quantify the mammographic parenchymal patterns. These features are grouped into (i) features based on the absolute values of the -ray levels, (11) features based on gray-level histogram analysis, (iii) features based on Fourier analysis, and (iv) features based on the spatial relationship among gray levels within the ROI.

Features based on the absolute value of the gray levels

Figure 3A:
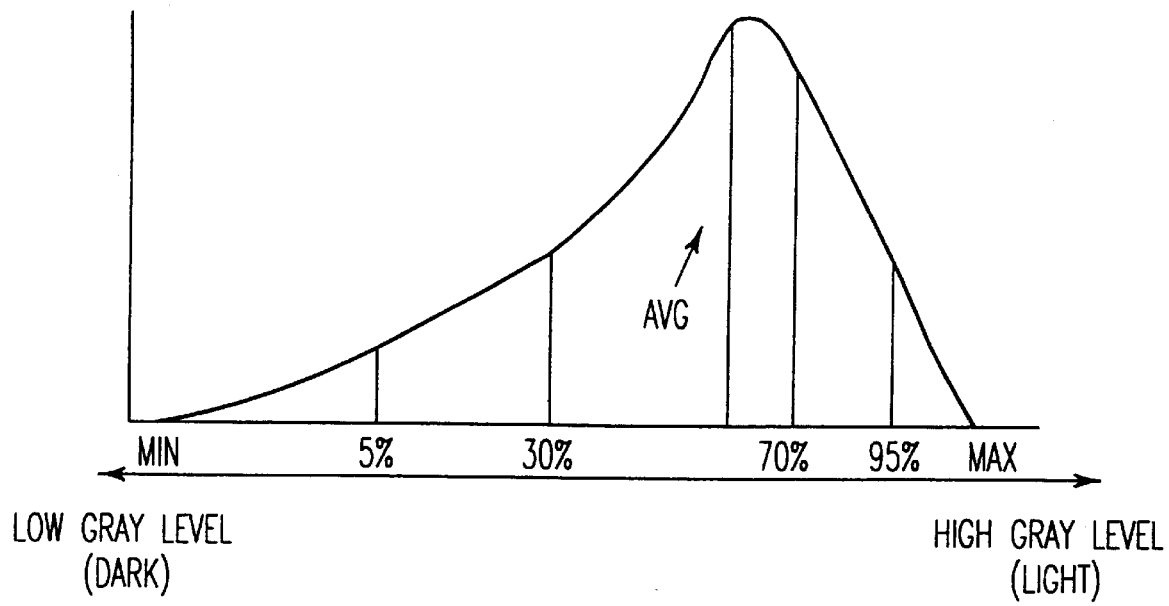
FIGS. 3a and 3b are schematic histograms of (a) a dense ROI and (b) a fatty ROI, respectively.
Figure 3B:
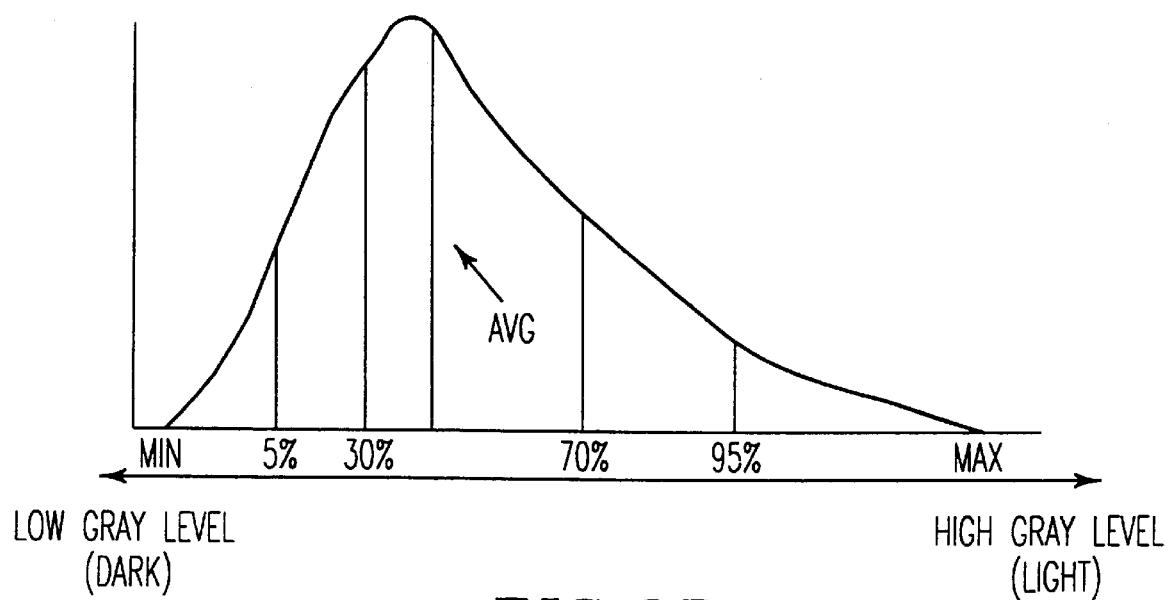

Features based on the absolute gray level values (features 1–7 below) include the maximum, minimum, average gray level, and various gray-level thresholds which partition an ROI into light and dark binary regions. The gray-level thresholds which yield 5%, 30%, 70%, 95% of the area under the gray-level histogram of an ROI (cumulative distribution function: CDF) are schematically shown in FIG. 3. FIG. 3 shows schematically gray-level histograms of a dense ROI and a fatty ROI. Radiographically the breast consists mainly of two component tissues: fibroglandular tissue and fat. Regions of brightness in mammography associated with fibroglandular tissue are referred to as mammographic density. These features (1–7) are used as a means to quantify indirectly the brightness of the selected region, which may yield information regarding the denseness of the region.

1) MAX: Maximum gray level of the ROI.
2) MIN: Minimum gray level of the ROI.
3) AVG: Average gray level of the ROI.
4) 5% CDF: Gray level yielding 5% of the area under the histogram of the ROI.
5) 30% CDF: Gray level yielding 30% of the area under the histogram of the ROI.
6) 70% CDF: Gray level yielding 70% of the area under the histogram of the ROI.
7) 95% CDF: Gray level yielding 95% of the area under the histogram of the ROI.

Features based on gray-level histogram analysis

A dense ROI tends to have more pixels with high gray level values (low-optical density), yielding a gray-level histogram skewed to the left as schematically shown in FIG. 3. A fatty ROI tends to have more pixels with low gray level values (high-optical density), yielding a gray-level histogram skewed to the right. Features such as skewness and balance (defined below) of a histogram can be used to quantify the ratio of pixels with high gray level values to those with low gray level values, thereby approximating the local tissue composition (fibroglandular tissue vs. fat). As shown in FIG. 3, a dense ROI should yield a negative value of skewness and a value less than one for balance, whereas a fatty ROI should yield a positive value of skewness and a value greater than one for balance. The skewness measure has been studied by Byng et al. [42] to evaluate percent mammographic density in the breast. The two measures of balance using different percentages of the gray-level histogram are investigated to also quantify the skewness of the histogram.

8) Balance1: (95% CDF–Ave)/(AVG–5% CDF) [97].
9) Balance2: (70% CDF–Ave)/(AVG–30% CDF).
10) Skewness $$\frac{m_3}{m_2^{3/2}} \text{ where } m_k = \sum_{i=0}^{G_h} n_i (i - \bar{i})^k / N,$$

$$N = \sum_{i=0}^{G_h} n_i, \quad \bar{i} = \sum_{i=0}^{G_h} n_i i$$

and $n_i$ is the number of occurrences of gray-level value i. $G_h$ is the highest gray level value in the ROI [42].

Features based on spatial relationship among gray levels

Two features based on spatial relationship among gray levels were investigated to characterize the texture patterns in the ROI: the coarseness and contrast measures which were first proposed by Amadasun et al. [2] and have been used to characterize Wolfe patterns by Tahoces et al. [40]. The mathematical definitions of the two texture features are given below. The amount of local variation in gray level corresponds visually with the level of coarseness (local uniformity) of a texture. As the amount of variation in gray level increases, the perceived uniformity (coarseness) of a texture decreases. Thus, the coarseness of a texture is obtained by quantifying the local variation in gray level. Since both the dynamic range of gray levels in an image and the spatial frequency of changes in gray level (amount of local gray-level variation) affect the contrast of a texture, the contrast measure includes two terms: the first term quantifies the differences among all gray levels in the ROI, and the second term quantifies the amount of local variation in gray level presented in the ROI. Notice that the gray-level differences in an ROI is weighted by the amount of local variation. Thus, ROIs which have similar gray level differences may have different contrast depending on the local variation in the ROIs. Conversely, ROIs which have the same amount of local variation may have different contrast depending on the gray level differences in the ROIs.

11) Coarseness: local uniformity [52]

$$COS = \left[\sum_i^{G_h} p_i s(i)\right]^{-1}$$

12) Contrast: local contrast [122]

$$CON = \left[\frac{1}{N_g(N_g-1)}\sum_{i=0}^{G_h}\sum_{j=0}^{G_h} P_i(P_j(i-j))^2\right]\left[\frac{1}{n^2}\sum_{i=0}^{G_h} s(i)\right]$$

where $N_g$ is the total number of different gray levels present in the ROI, $G_h$ is the highest gray-level value in the ROI. $p_i$ is the probability of occurrence of gray-level value i, N is the width of the ROI, d is the neighborhood size (half of the operating kernel size), n=N−2d, and the ith entry of s is given by $$S(i) = \begin{cases} \sum |i - A_i| \\ 0 \end{cases}$$

for i ∈{$N_i$} if $N_i$ 0
otherwise
in which {$N_i$} is the set of pixels having gray level i $$A_i = \frac{1}{W-1}\sum_{p=-d}^{d}\sum_{p=-d}^{d} f(x+p, y+q)$$

$(p, q) \neq (0, 0)$ to exclude $(x, y)$ $$W=(2d+1)^2 \ (d=2)$$

Features based on Fourier transform analysis

The texture properties in each ROI were also analyzed from the two-dimensional Fourier transform. Background-trend correction was performed within the ROI prior to the application of the Fourier transform in order to eliminate the contribution of the variation from the gross anatomy of the breast background (low frequency component). The root-mean-square (RMS) variation and first moment of power spectrum (FMP) from the Fourier transform as defined below [53] were calculated to quantify the magnitude and spatial frequency content of the fine underlying texture in the ROI after the background trend correction. The RMS variation and the first moment of power spectrum have been investigated by Katsuragawa et al. [54] to analyze interstitial disease in chest radiographs, Tahoces et al. [40] to classify Wolfe patterns in mammograms and by Caligiuri et al. [55] to characterize bone textures in skeletal radiographs.

13) RMS variation: root mean square of power spectrum

14) FMP: first moment of power spectrum $$FMP = \int\int\sqrt{u^2+v^2}|F(u,v)|^2 dudv / \int\int |F(u,v)|^2 dudv$$

where $$F(u,v) = \int\int f(x,y)e^{-j2\pi(xu+yv)}dxdy, \text{ i.e., } F(u,v)$$

is the Fourier transform of the background corrected ROI.

Classification of BRCA1/BRCA2-Mutation Carriers and Cases at Low Risk

Classification of BRCA1/BRCA2 mutation carriers and "low-risk" women is one approach we employed to relate mammographic features to breast cancer risk. In this approach, the ability of each individual computer-extracted feature was evaluated using receiver operating characteristics (ROC) methodology [44,45]. In ROC analysis, the values of the individual features were used as the decision variables. The area under the ROC curve ($A_z$) was used as an index to indicate the discriminant ability of the individual features in distinguishing between the BRCA1/BRCA2-mutation carriers and the "low-risk" cases.

In addition, methods of combining multiple mammographic features were investigated. Two subsets of features were selected as important features from all the available features based on (1) their individual feature performances and (2) their collective performance in discriminating between the BRCA1/BRCA2-mutation carriers and the "low-risk" cases. These selected features were then merged using linear discriminant analysis [56]. The ability of the model in discriminating between the BRCA1/BRCA2-mutation carriers and the "low-risk" cases was evaluated using ROC analysis [44,45].

Figure 4:
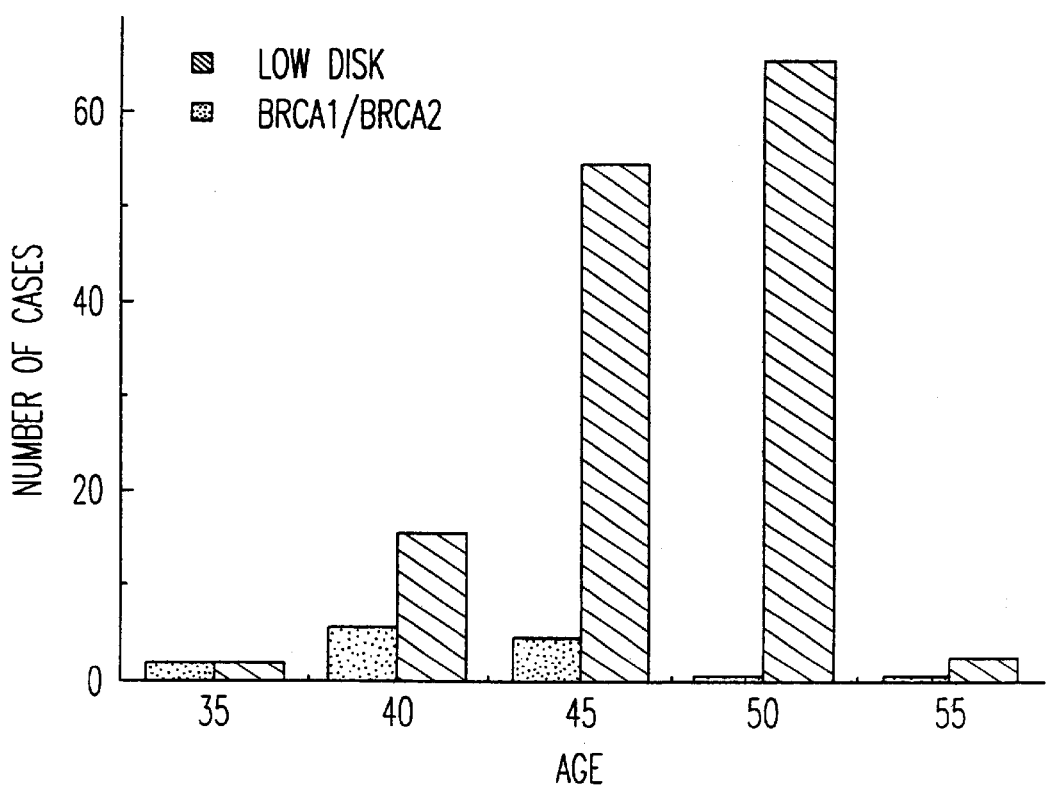
FIG. 4 is a bar graph illustrating a distribution of 15 BRCA1/ BRCA2 -mutation carriers and the 143 "low-risk" women in terms of age.

The classification analysis was performed on the 15 BRCA1/BRCA2-mutation carriers and the 143 low-risk cases. The distribution of the 15 BRCA1/BRCA2-mutation carriers and the 143 low-risk women in terms of age is shown in FIG. 4. It should be noted that the BRCA1/BRCA2-mutation carriers tend to be younger than the "low-risk" cases. The age of the BRCA1/BRCA2-mutation carriers ranges from 33 years to 54 years, with a mean of 40.8 years and a median of 40 years. The age of the women in low-risk group ranges from 35 years to 54 years, with a mean of 44.7 years and a median of 45 years.

To rule out possible bias due to the difference in age distribution of the BRCA1/BRCA2-mutation carriers and the "low risk" cases, classification was also performed on the 15 BRCA1/BRCA2-mutation carriers and 30 "low risk" cases who were randomly selected and age-matched with the 15 BRCA1/BRCA2-mutation carriers at 5-year intervals. The two-to-one ratio of the number of low-risk cases to that of the BRCA1/BRCA2-mutation carriers was determined based on the number of age-matched cases available in the low-risk group (FIG. 4).

Table 2 lists the $A_z$ values indicating the performance levels of the 14 features obtained from the entire group and the age-matched group in the task of distinguishing between the BRCA1/BRCA2-mutation carriers and the low-risk cases. As shown in Table 2, the majority of the features yield an $A_z$ value greater than 0.70 for both the entire group and the age-matched group. No consistent increases or decreases in the $A_z$ values of the 14 individual features were observed when they were applied to the age-matched group. The average of the $A_z$ values from the 14 features obtained from the age-matched group ($A_z$=0.72) is similar to that obtained from the entire group ($A_z$=0.73). This suggests that the slight difference in age distribution between the BRCA1/BRCA2-mutation carriers and the "low risk" cases does not have strong influence on the performance of these individual features for this database.

Figure 5A:
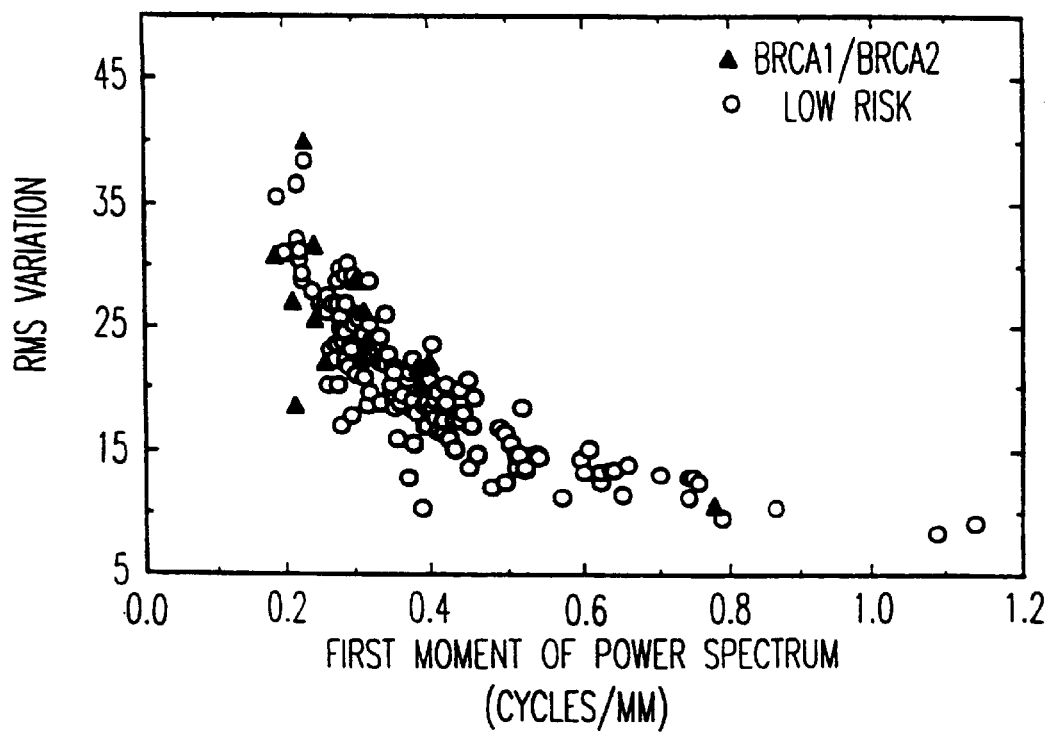
FIGS. 5a, 5b and 5c are graphs illustrating distribution of the "low-risk" group and the BRCA1/BRCA2-mutation carriers in terms of various selected features, including (a) RMS variation as a function of first moment of power spectrum, (b) coarseness as a function of skewness, and (c) contrast as a function of skewness, respectively, for the entire group.
Figure 5B:
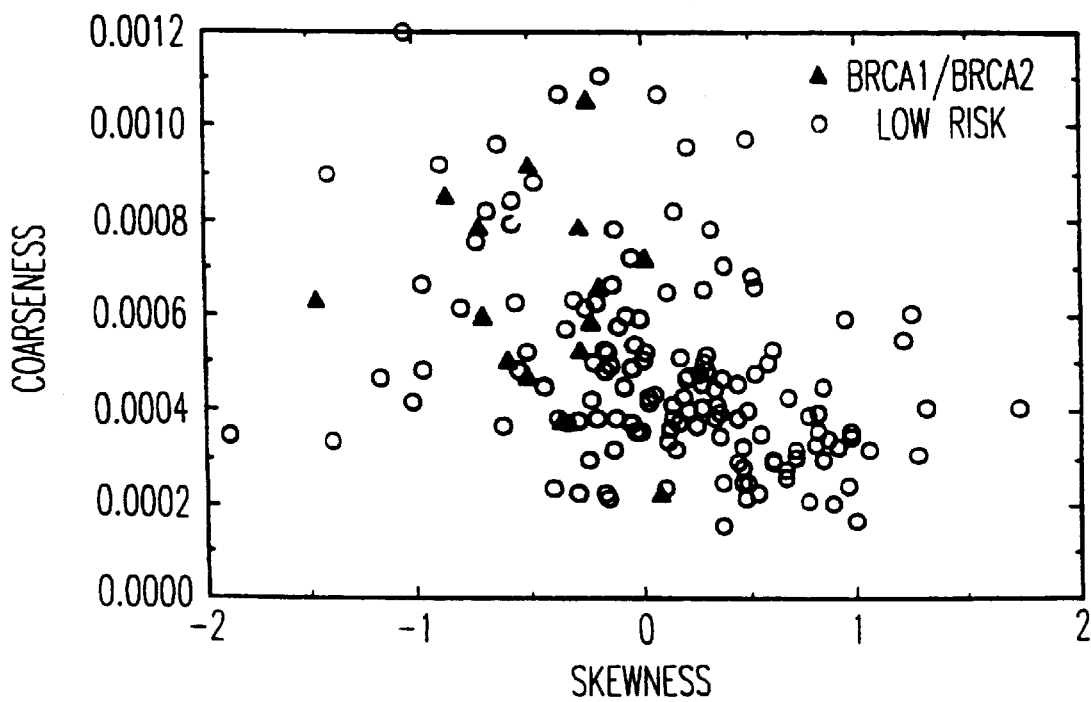
Figure 5C:
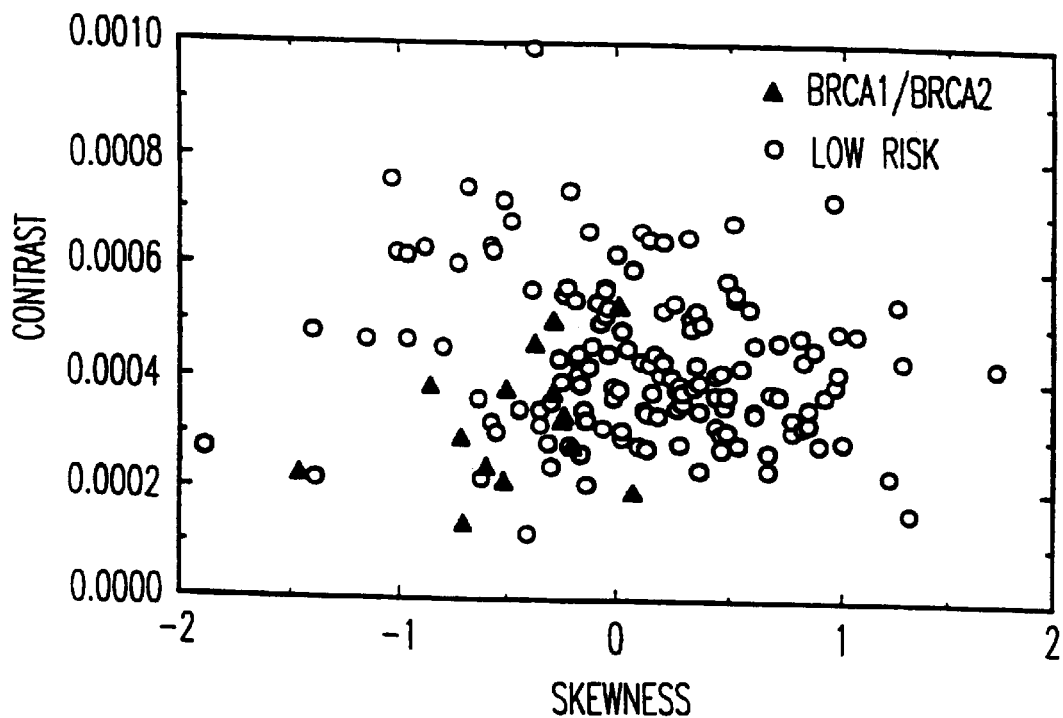
Figure 6A:
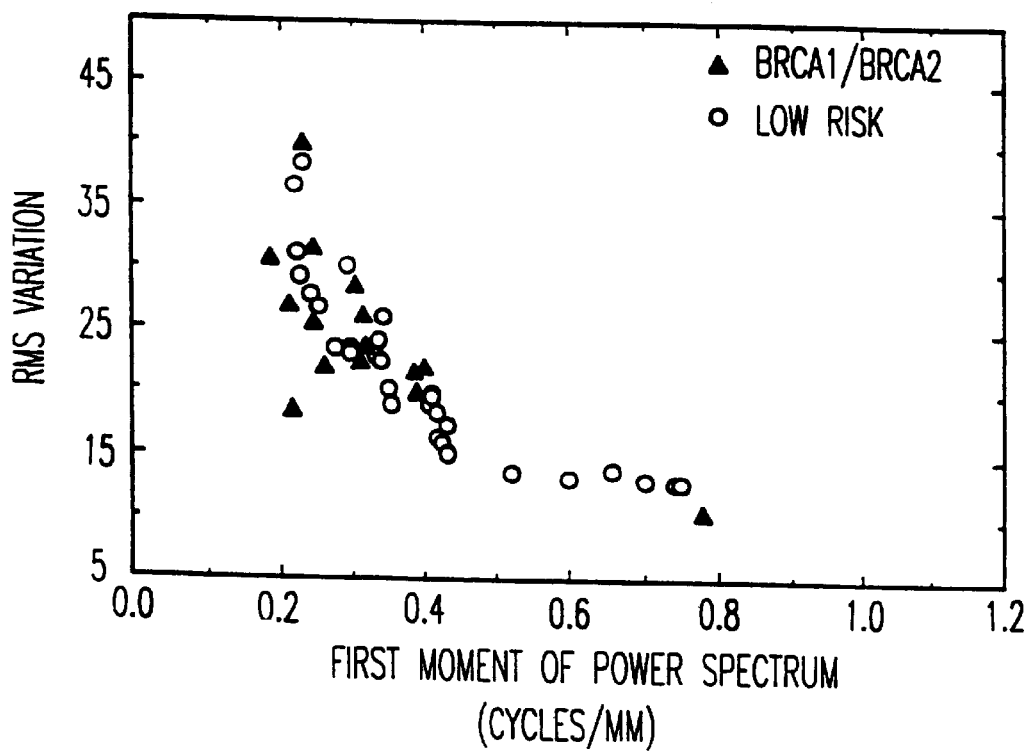
FIGS. 6a, 6b, and 6c are graphs illustrating distribution of the "low-risk" group and the BRCA1/BRCA2-mutation carriers in terms of various selected features including (a) RMS variation as a function of first moment of power spectrum, (b) coarseness as a function of skewness, and (c) contrast as a function of skewness, respectively, for the age-matched group.
Figure 6B:
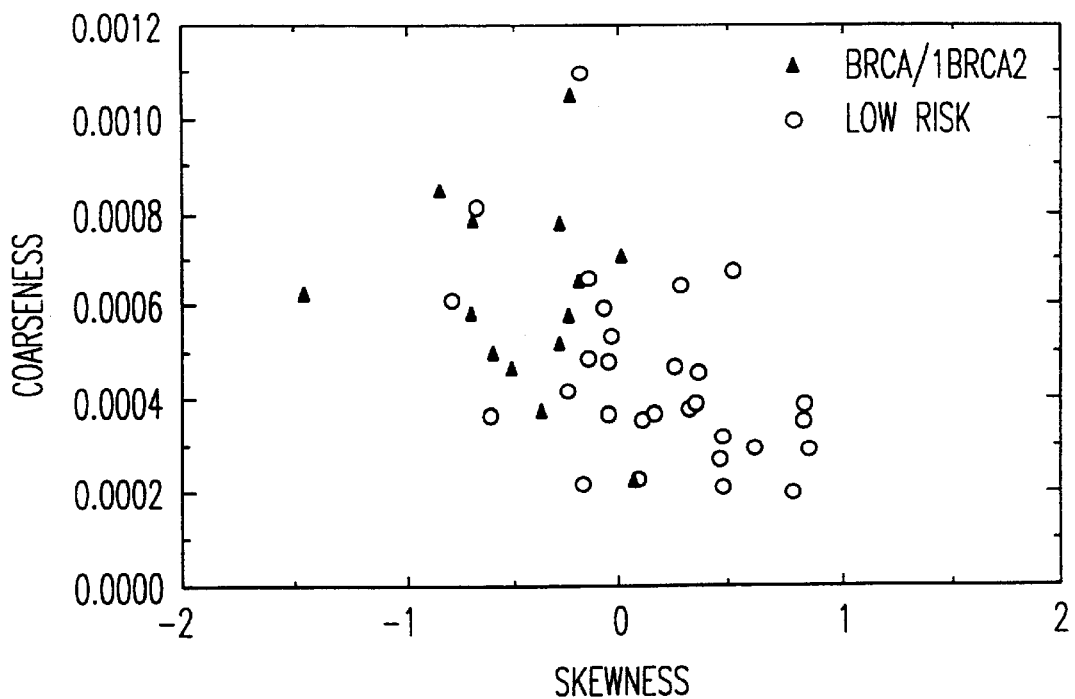
Figure 6C:
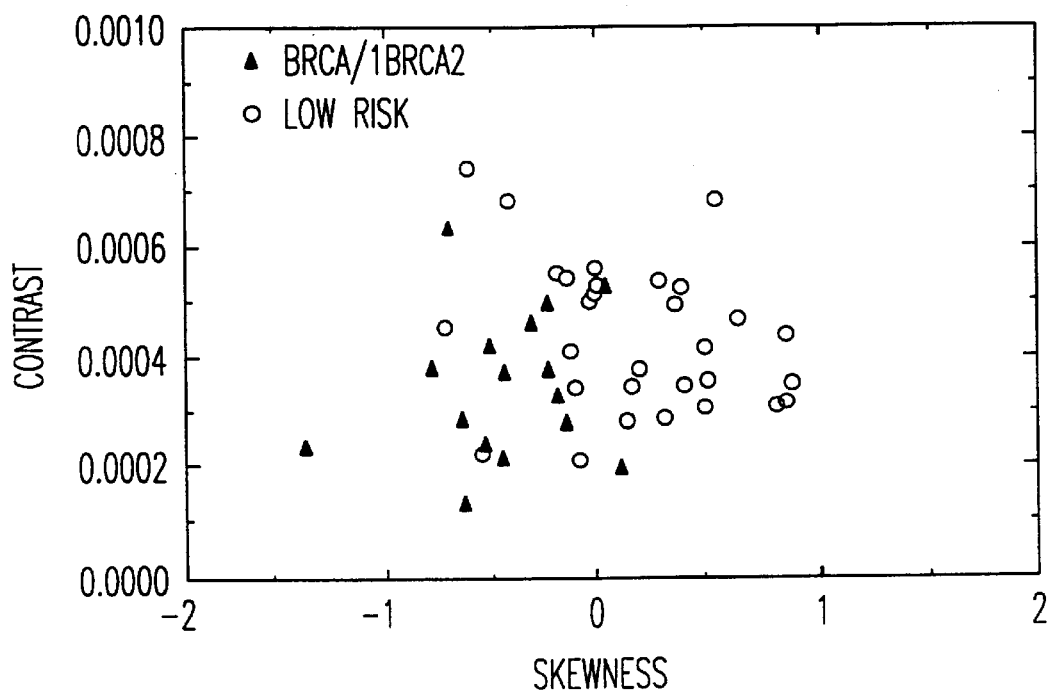
Figure 7A:
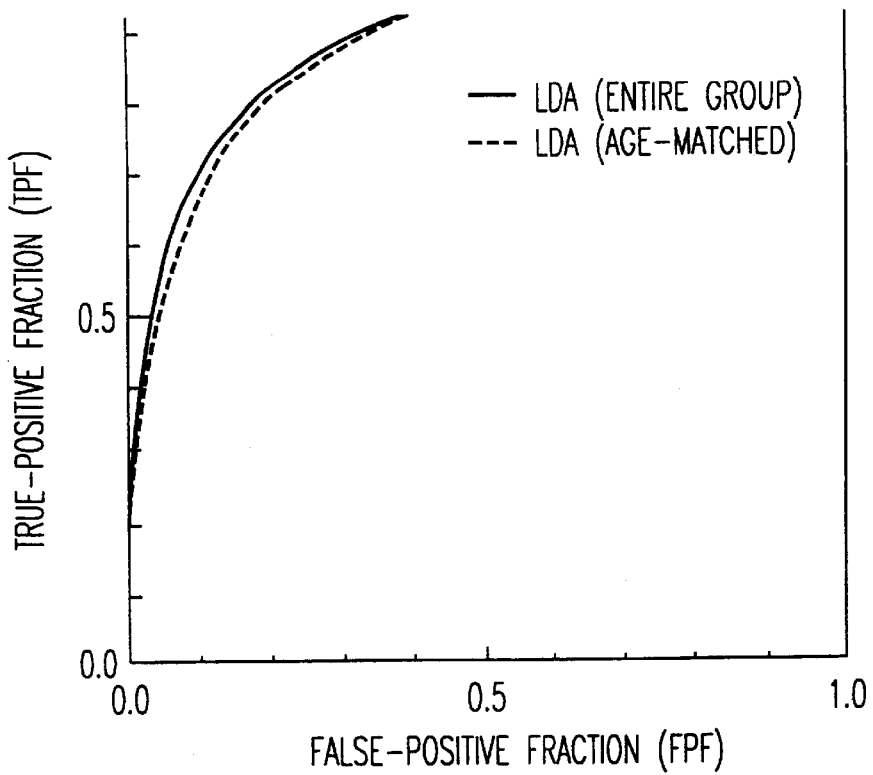
FIGS. 7a and 7b are graphs illustrating ROC curves of the LDA using (a) feature set A and (b) feature set B, respectively.
Figure 7B:
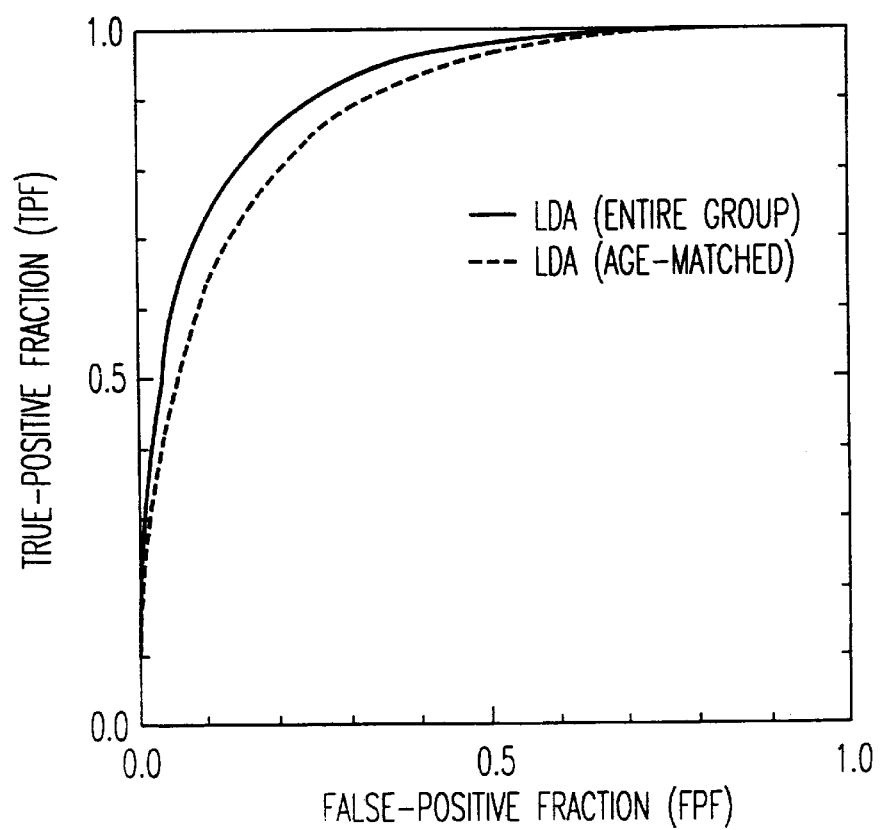
Figure 8A:
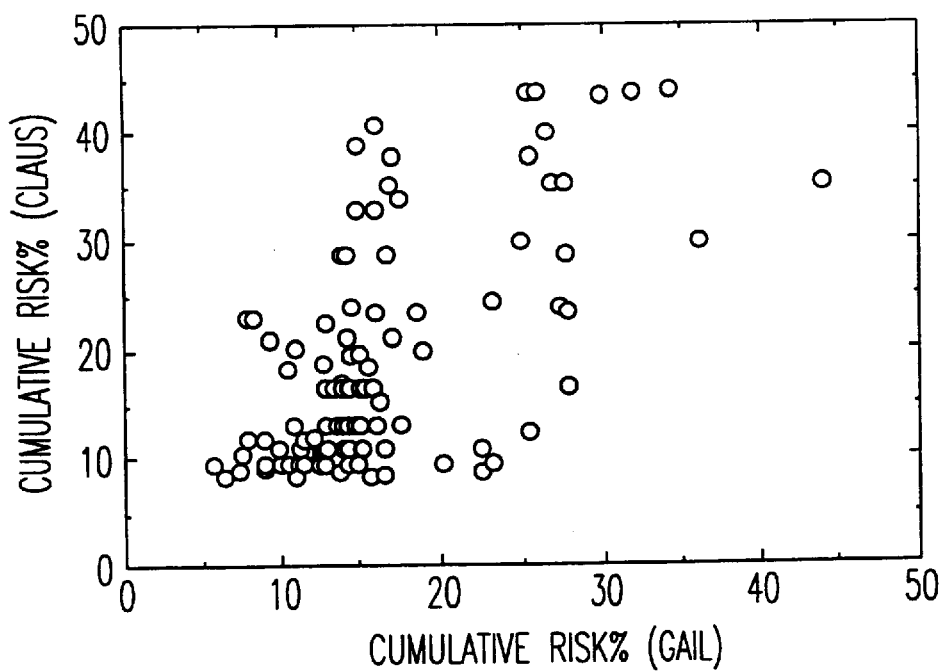
FIGS. 8a and 8b are graphs illustrating correlation between (a) cumulative risk and (b) 10-year risk, respectively, as estimated from the Gail model and the Claus model.
Figure 8B:
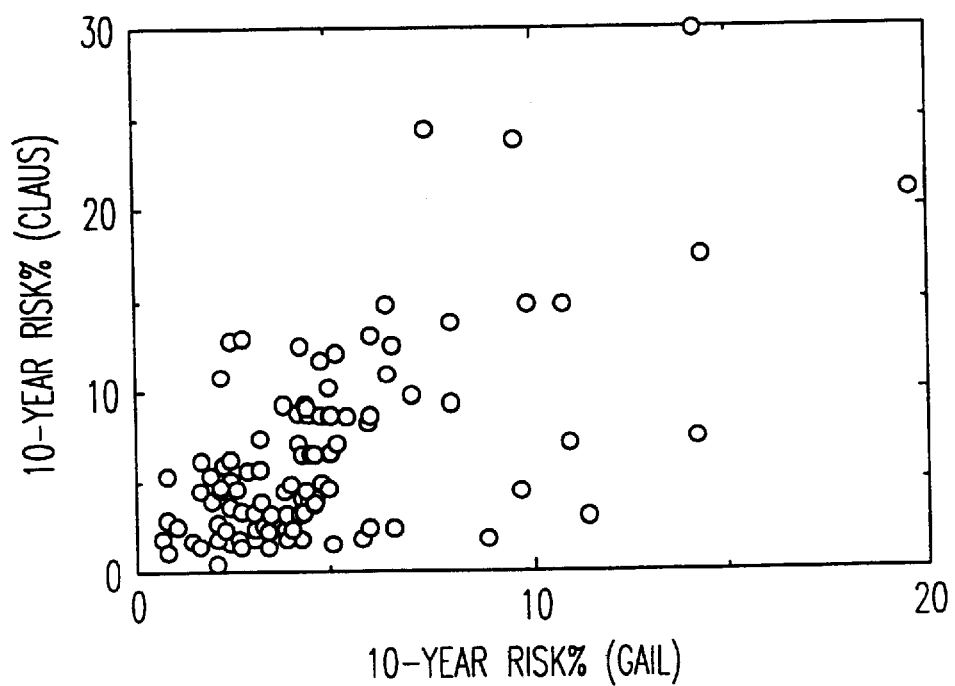

FIGS. 5 and 6 show cluster plots of the 15 BRCA1/BRCA2-mutation carriers and the "low-risk" cases in both the entire group and the age-matched group, respectively, in terms of some selected features. It is apparent from these figures that the mammographic patterns of the BRCA1/BRCA2-mutation carriers tend to have a

TABLE 2

Performance of 14 computer-extracted features in differentiating between the 15 BRCA1/BRCA2-mutation carriers and the "low-risk" cases in the entire database and the age-matched group in terms of $A_z$.

| Features | $A_z$ entire group | $A_z$ matched group |
| --- | --- | --- |
| Features based on the absolute value of the gray value | | |
| maximum gray level | 0.68 | 0.69 |
| minimum gray level | 0.59 | 0.53 |
| average gray level | 0.76 | 0.71 |
| 5% CDF | 0.74 | 0.69 |
| 95% CDF | 0.75 | 0.71 |
| 30% CDF | 0.76 | 0.73 |
| 70% CDF | 0.75 | 0.72 |
| Features based on gray-level histogram analysis | | |
| balance 1 | 0.70 | 0.73 |
| balance 2 | 0.75 | 0.80 |
| skewness | 0.82 | 0.87 |
| Features based on Fourier analysis | | |
| first moment of power spectrum | 0.74 | 0.69 |
| (FMP) RMS variation | 0.70 | 0.63 |
| Features based on spatial relationship among gray levels | | |
| coarseness | 0.72 | 0.73 |
| contrast | 0.73 | 0.74 |
| Average $A_z$ of the 14 features | 0.73 ± 0.05 | 0.72 ± 0.08 | higher value of RMS variation, a lower value of first moment of power spectrum (IMP), a lower (negative) value of skewness, a higher value of coarseness and a lower value of contrast than do those of the "low risk" cases, which suggests that the BRCA1/BRCA2-mutation carriers tend to have dense breasts and their mammographic patterns tend to be coarse and of low contrast. The Fourier analysis suggests that mammographic parenchymal patterns of the BRCA1/BRCA2-mutation carriers contain large components of low frequency contents (low FMP and high RMS variation).

In general, breast parenchymal patterns can be described by the amount of dense regions and by the heterogeneity/homogeneity of the patterns in dense portions of the breast. Thus, we believe that a combination of mammographic features will perform better than a single feature in assessing risk. Four features, skewness, contrast, coarseness and FMP measures, were selected as important features based on their individual performances as well as the properties that are characterized by the features. We refer to this set of features as feature set A (Table 3a). The second set of features was selected based on the collective performance determined using a stepwise linear discriminant analysis procedure [57]. They were merged into a single measure using linear discriminant functions.

Linear discriminant analysis (LDA) is a well-established statistical technique [57]. A discriminant function can be constructed for classification of the two groups of cases. The discriminant function is formulated by a linear combination of the feature variables:

$$D = a_0 + \sum_{i=1}^{n} a_i X_i$$

where n is the number of feature variables, the $X_i$'s are a collection of the feature variables and the $a_i$'s are the coefficients estimated from the input data during training so that the separation between the distributions of the discriminant scores, D, in the two groups is maximized. This is accomplished by maximizing the ratio of the between-groups sum of squares to the within-group sum of squares for the two distributions of the discriminant scores. Geometrically, the linear discriminant function can be considered as a projection of the feature vector onto an axis in the multidimensional feature space. The component of the feature vector of each case along the axis corresponds to the discriminant score of the case. The linear discriminant analysis was accomplished in two steps. First, a stepwise feature selection was employed to select useful features to formulate the discriminant function. Second, the selected features were used to determine the coefficients $a_i$ in the discriminant function to achieve maximum separation. The criterion used to choose good feature variables in the stepwise procedure is accomplished by minimizing the ratio of the within group sum of squares to the total sum of the squares of the distribution (Wilks' lambda) (i.e., a self consistency test). A detailed discussion of the underlying statistical theories for the stepwise procedure using the Wilks' lambda criterion is given in the literature [57]. Four features were selected from the stepwise procedure: skewness, contrast, coarseness and balance2. We refer to this set of features as feature set B (Table 3a).

The performances of the linear discriminant analysis methods using each of the two sets of selected features in discriminating the BRCA1/BRCA2-mutation carriers and the "low risk" cases were evaluated using ROC analysis. In ROC analysis, the discriminant scores from the linear discriminant function were used as decision variables to evaluate the performance of the linear discriminant method.

The two sets of selected features are listed in Table 3a. Table 3b summarizes the performances of the linear discriminant analysis (LDA) method in merging the selected features from each of the two feature sets to distinguish between the BRCA1/BRCA2-mutation carriers and the "low risk" cases in the entire group and the age-matched group in terms of $A_z$. In addition, the performance at high sensitivity was quantified in terms of the partial area index $_{0.90}A_z'$ [48] and is shown in Table 3c.

The small differences in the performance of the LDA when it was applied to the entire database and the age-matched group indicate that differences in the age distribution did not have influence on its performance in differentiating between the BRCA1/BRCA2 mutation carriers and the "low-risk" women.

Further, the small variation (one feature different) in the selected features between the feature sets does not have strong influence on the performance of the LDA method in its ability to distinguish between the BRCA1 mutation carriers and the "low-risk" cases. The consistently higher performance of the LDA method at the high sensitivity ($0.09A_z'$) when feature set B was used may be due to the difference in the performance of the two features (FMP and balance2), which was the only difference between the two feature sets. As shown in Table 2, balance2 in feature set B yields a higher performance at high sensitivity ($_{0.90}A_z'=0.80$) than that ($_{0.09}A_z=0.69$) of FMP in feature set A, while balance2 and FMP have similar values of $A_z$. Two-tailed p values obtained from the CLABROC [46,49] and the modified CLABROC [48] programs showed that the difference in the performance obtained for the LDA when it used the different feature sets are not statistically significant in terms of both Az and $_{0.90}A_z'$.

TABLE 3

(a) Selected features: feature set A and feature set B, and the performance of the LDA functions in terms of (b) $A_z$, and (c) $_{0.09}A_z'$ in distinguishing between BRCA1/BRCA2 mutation carriers and the "low-risk" cases in the entire group and the age-matched group using the two sets of features.

| Feature set A (Features selected based on individual performance) | Feature set B (Features selected from stepwise linear discriminant analysis) |
|---|---|
| skewness | skewness |
| contrast | contrast |
| coarseness | coarseness |
| FMP | balance2 |

(a)

| LDA Models | Az for entire group | Az for age-matched group |
|---|---|---|
| Using feature set A | 0.89 ± 0.05 | 0.88 ± 0.05 |
| Using feature set B | 0.91 ± 0.04 | 0.89 ± 0.05 |

(b)

| LDA Models | $_{0.09}A_z'$ for entire group | $_{0.09}A_z'$ for age matched group |
|---|---|---|
| Using feature set A | 0.48 ± 0.19 | 0.49 ± 0.19 |
| Using feature set B | 0.59 ± 0.16 | 0.51 ± 0.18 |

(c)

Relationship of Mammographic Features with the Gail and the Claus Models

Another approach that we used to relate mammographic features to breast cancer risk was to employ multivariate statistical models, such as linear regression analysis and artificial neural networks, to merge multiple computer-extracted features including age into models to predict risk (both lifetime risk and the 10-year risk) as estimated from either the Gail or Claus model. The features were selected using a stepwise procedure in the linear regression analysis [56,58].

All the cases except the 27 BRCA1/BRCA2-mutation carriers, were used in this study. The 27 BRCA1/BRCA2-mutation carriers were not included in the correlation study, because neither of the two models are accurate in predicting risk for women who are BRCA1/BRCA2-mutation carriers [23]. Among these cases (365), 303 of them (data set A) had complete information as required by the Gail model, 143 of them (data set B) had complete information as required by the Claus model, and 106 of them (data set C) had complete information as required by both the Gail and the Claus models. Thus, the cases used in establishing multivariate models to predict risk as estimated from the Gail model and the Claus model were different. Data set A was used to establish models in predicting risk as estimated from the Gail model and data set B was used to establish models in predicting risk as estimated from the Claus model. Further, common cases in data set C were used to establish models in predicting risk as estimated from either the Gail model or the Claus model. Table 4 summarizes the different analyses that were performed in the following sections for the two models using different data sets. The relationship of the Gail model with the Claus model for the common data set C is shown in FIG. 5.8, yielding a positive correlation coefficient of 0.60 and 0.61 for the lifetime risk and the 10-year risk estimated, respectively.

TABLE 4

Three data sets, number of cases in each data set and response variables used to establish models in predicting risk (response variable) as estimated from the Gail and the Claus models.
Data sets used in the different correlation studies

| Data set | Number of cases | Response Variables |
|---|---|---|
| A | 303 | lifetime risk from Gail model |
| A | 303 | 10-year risk from Gail model |
| B | 143 | lifetime risk from Claus model |
| B | 143 | 10-year risk from Claus model |
| C | 106 | lifetime risk from Gail model |
| C | 106 | 10-year risk from Gail model |
| C | 106 | lifetime risk from Claus model |
| C | 106 | 10-year risk from Claus model |

Linear regression analysis [50] is a statistical methodology for predicting values of one or more response variables from a collection of predictors. The linear regression model with a single response takes the form.

$$Y = a_0 + \sum_{i=1}^{n} a_i X_i + \varepsilon$$

where Y is a response variable (observed responses $y_j$), $X_i$'s are a collection of predictor variables that are thought to be related to the response variable Y, and e is the difference between the observed response and the mean E(Y) in prediction. The term regression is a short form of "regression towards the mean". The term linear refers to the fact that the mean E(Y) of the response Y is assumed to be a linear function of the unknown parameters $a_i$, the regression coefficients. One of the objectives of regression analysis is to develop an equation that "fits" the model in (5-1) to the observed $y_j$. The regression coefficients are determined by the method of least-squares, which minimizes the sum of squared difference between the observed $y_j$ and the values given by the regression line. The goodness of fit can be measured by the correlation coefficient R or the coefficient of determination $R^2$. The quantity $R^2$ gives the proportion of total variation in the response variable that can be "explained" by the variation in the predictor variables in the model. At one extreme, $R^2=I$ indicates a perfect fit, that is the fitted regression line passes through all the data points, which means that the predictor variables in the model "explain" 100% of the variation in the response variable. At the other extreme, $R^2=0$, means that the predictor variables do not have any prediction power for the response.

In our study, the linear regression analysis was accomplished in two steps. First, a stepwise regression was undertaken to identify from all the available features the most useful features to be used as the predictors in model (5-1). The stepwise feature selection procedure from MINITAB [58] was used. A detailed discussion of the underlying statistical theories for the stepwise procedure can be found in the literature [56,58]. Secondly, the selected features were used to determine the regression coefficients in the regression function to achieve the minimum square difference between the observed responses and the predicted values.

Logistic regression analysis is usually used for risk prediction in situations where the probability p (risk %) of a particular event (e.g., contracting breast cancer) is to be estimated for individuals with known characteristics (e.g., age, family history, etc.). In this situation, logistic regression is used with binary "truth" data (e.g., indicating that each patient did or did not contract the disease in question) to calculate a quantitative relationship between each combination of multivariate characteristics and the probability of the event. This relationship can then be used to estimate risk in patients whose characteristics are known, but whose (future) outcome is unknown. The risks estimated from the Gail model (which was developed by using logistic regression analysis) or from the Claus model are continuous, rather than binary, so we cannot use logistic regression in our study. Therefore, we performed linear regression analysis on our variables (mammographic features and age) to predict the Gail and Claus risks. Further, we performed both the log transformation of the Gail and Claus risks (log[risk %]) and the logit transformation of these risks $$\left(\log\left[\frac{risk\%}{1-risk\%}\right]\right)$$

Section 5.8) in an attempt to predict the Gail and Claus risks from knowledge of our variables by linear regression.

Since age is the most important factor for the prediction of breast cancer risk and it is used in both the Gail and Claus models, age and the 14 computer-extracted mammographic features (Table 2) were used in the feature selection procedure. A total of eight sets of features were selected by the stepwise LDA feature selection procedure using the four different response variables (i.e., the lifetime risk or the 10-year risk as estimated from the Gail or the Claus model) and the three different data sets as listed in Table 4.

Conventional three-layer artificial neural networks [47] were also employed to merge the selected features to predict risk as estimated from the Gail or the Claus model. The structure of the ANNs employed depended on the response variable used and the features selected to predict the response variable using the different data sets listed in Table 4. The ANNs had a structure of either 4 input units, one hidden unit and one output unit, or 3 input units, one hidden unit and one output unit. The desired "truth" for use in training the ANNs was the risk as estimated from the Gail model or the Claus model. The ANNs were trained using a self-consistency test and a round-robin method [47]. The correlation coefficients [56] between the ANN outputs from the round-robin method and the desired "truth" (i.e., the risk as estimated from the Gail or Claus model) were calculated to evaluate the ability of the trained ANNs in predicting risk as estimated from the Gail or the Claus model.

A total of eight regression functions were generated using the eight sets of features selected from the stepwise feature selection procedure. The selected features and the corresponding regression functions indicated with an asterisk are listed in Table 5. The correlation coefficient (R) between the predicted values from each regression function and the corresponding response variable was calculated to evaluate the ability of the fitted model to predict risk as estimated from the clinical model.

In the eight regression models indicated with an asterisk, age was selected as a useful predictor in all but two models. In addition, to study the prediction power of the mammographic features without age, we performed the regression on the selected computer-extracted features only. Meanwhile, we added age to the two sets in which age was not initially selected, and performed the regression on the selected computer-extracted features along with age. These eight regression functions are also listed in Table 5 for comparison.

ANNs were used to merge the selected features in each of the 16 feature sets obtained from the linear regression analysis. The correlation coefficient (R) between the ANN outputs from the round-robin method and the desired "truths" (risk as estimated from the Gail or Claus model) are listed in Table 6. The structures of the ANNs used either had 4-input units, two hidden units and one output unit when four features were used as inputs or had 3-input units, two hidden units and one output unit when three features were used as inputs.

Correlation coefficients (R) were employed to evaluate the relationships between the radiographic methods (LDA functions and ANN models) and the clinical (Gail and Claus) models in order to compare with results (the correlation coefficient) obtained in other studies. Since $R^2$ can be used to evaluate individual contributions (the proportion of total variation in the response variable that can be explained by an individual predictor) of predictor variables in a model to the overall prediction power of the model in predicting the response variable [56], $R^2$ was used in our study to evaluate the improvement in the prediction power when adding a potential predictor to a model.

TABLE 5

Linear regression models and corresponding correlation coefficients between each model and risk as estimated from the Gail and Claus models. (a) Using the Gail model and data set A, (b) using the Claus model and data set B and (c) using both the Gail and the Claus models and database C. (Note: the* indicates that the features used in the model were selected from the linear regression stepwise feature selection procedure. Skew, con, cos, and rms in the Table correspond to the features of skewness, contrast, coarseness and RMS variation. For all models: P < 0.0001).

Correlation with the Gail model
Data set A

| Responses | Models | R |
|---|---|---|
| lifetime risk | 22.0 − 1.37 skew + 7710 cos − 9741 con − 0.213 age | 0.41 |
| *lifetime risk | 12.4 − 1.67 skew + 8181 cos − 10458 con | 0.37 |
| *10-year risk | −3.26 − 0.426 skew + 3451 cos − 3831 con + 0.153 age | 0.41 |
| 10-year risk | 3.62 − 0.226 skew + 2936 cos − 3226 con | 0.24 |

(a)
Correlation with the Claus model
Data set B

| Responses | Models | R |
|---|---|---|
| *lifetime risk | 32.5 − 3.17 skew + 0.322 rms − 26183 con − 0.252 age | 0.55 |
| lifetime risk | 21.5 − 3.98 skew + 0.311 rms − 26017 con | 0.52 |
| *10-year risk | 8–98 − 1.26 skew + 0.162 rms − 10052 con + 0.354 age | 0.57 |
| 10-year risk | 6.51 − 0.113 skew + 0.181 rms − 10271 con | 0.37 |

(b)
Correlation with the Gail and the Claus models
Data set C

| Responses | Model | R |
|---|---|---|
| (Gail model) | | |
| lifetime risk | 20.7 − 2.21 skew + 6747 cos − 13241 con − 0.0603 age | 0.43 |
| *lifetime risk | 18.1 − 2.42 skew + 6627 cos − 13082 con | 0.40 |
| *10-year risk | 5–89 − 0.786 skew + 2585 cos − 4713 con + 0.255 age | 0.57 |
| 10-year risk | 5.38 + 0.082 skew + 3212 cos − 5401 con | 0.24 |

TABLE 5-continued

Linear regression models and corresponding correlation coefficients
between each model and risk as estimated from the Gail and Claus models.
(a) Using the Gail model and data set A, (b) using the Claus model and
data set B and (c) using both the Gail and the Claus models and
database C. (Note: the* indicates that the features used in the
model were selected from the linear regression stepwise feature selection
procedure. Skew, con, cos, and rms in the Table correspond to the
features of skewness, contrast, coarseness and RMS variation.
For all models: P < 0.0001).

(Claus model)

| | | |
|---|---|---|
| lifetime risk | 31.6 − 4.01 skew + 0.332 rms − 27561 con − 0.200 age | 0.57 |
| *lifetime risk | 23.0 − 4.70 skew + 0.312 rms − 26994 con | 0.56 |
| 10-yr-Claus | 10.8 − 1.52 skew + 0.164 rms − 9907 con + 0.403 age | 0.62 |
| 10-yr-Claus | 6.52 − 0.112 skew + 0.210 rms − 11027 con | 0.39 |

(c)

TABLE 6

ANN models and corresponding correlation coefficients between each
model and risk as estimated from the Gail and Claus models (a) Using
the Gail model and data set A, (b) using the Claus model and data set
B and (c) using both the Gail and the Claus models and database C.
(Note: Skew, con, cos, and rms correspond to the features of skewness,
contrast, coarseness and RMS variation. For all models: P < 0.0001).

| Responses | Predictors | R |
|---|---|---|
| (a) Correlation with the Gail model Data set A | | |
| (Gail model) | | |
| lifetime risk | skew, cos, con, age | 0.47 |
| lifetime risk | skew, cos, con | 0.42 |
| 10-year risk | skew, cos, con, age | 0.45 |
| 10-year risk | skew cos con | 0.24 |
| (a) Correlation with the Claus model Data set B | | |
| (Claus model) | | |
| lifetime risk | skew, rms, con, age | 0.57 |
| lifetime risk | skew, rms, con | 0.56 |
| 10-year risk | skew, rms, con, age | 0.57 |
| 10-year risk | skew, rms con | 0.37 |
| (b) Correlation with the Gail and the Claus models Data set C | | |
| (Gail model) | | |
| lifetime risk | cos, con, skew, age | 0.43 |
| lifetime risk | cos, con, skew | 0.44 |
| 10-year risk | cos, con, skew, age | 0.60 |
| 10-year risk | cos, con, skew | 0.12 |
| (Claus model) | | |
| lifetime risk | rms, con, skew, age | 0.60 |
| lifetime risk | rms, con, skew | 0.61 |
| 10-year risk | rms, con, skew, age | 0.60 |
| 10-year risk | rms, con, skew | 0.44 |

(c)

We observed the following phenomena from the results listed in Tables 5 and 6. (i) Even when different response variables and different subsets of the database were used, similar mammographic features (in the models indicated with asterisk) were identified as important features to predict risk. Moreover, the sign that indicates the direction (decreasing the risk or increasing the risk) of the association between the mammographic features and risk as estimated from the Gail or Claus model is the same for the same features used in the different models. (ii) The inclusion of age has little effect in predicting lifetime risk; however, the inclusion of age substantially improved the correlation coefficients in predicting 10-year risk. This implies that age is more important than the mammographic features that we investigated in this study in predicting 10-year risk, whereas, the mammographic features are more important than age in predicting lifetime risk. iii) On average, the correlation coefficients between the predicted risk from both the linear regression functions or ANN models and the risk as estimated from the Claus model are higher than that from the Gail model. In other words, the selected mammographic features along with age are better predictors for the risk estimated from the Claus model than for the risk as estimated from the Gail model. iv) Given the same features and same data set, the ANN models yielded a correlation coefficient similar to that of the linear regression model in predicting the same response variable (the lifetime risk or the 10-year risk from the Gail or the Claus model).

It is intuitive that age is a strong predictor of 10-year risk, but not lifetime risk, as breast cancer is an aging disease and studies have shown that age is the most important risk factor in the prediction of breast cancer [23]. The stronger predictive power of the mammographic features for the lifetime risk indicates that the risk associated with the mammographic features are more related to the cumulative risk over a lifetime.

The difference in the prediction of the two clinical models (the Gail and Claus models) should be expected as there are many variations involved in the prediction of breast cancer, for example, the risk factors listed in Table 1. The risk predictors used in the two models, however, are selective and different [3,12]. Furthermore, the Gail and Claus models were developed using different databases and were intended to apply to different populations [3,12]. However, our database was not collected for either of the two models. It should be noted that the use of the Claus model is restricted to individuals who have a family history, and on the other hand, the Gail model can be used for any case in our database, which means that there are less variations involved in risk prediction using the Claus model than that using the Gail model. In other words, the characteristics of the cases in the database (e.g., data set C) may be more similar to the population from which the Claus model was developed than that from which the Gail model was developed. Thus, the risk as estimated from the Claus model for this population (data set C) is closer to the "true" (or the observed) risk than does the risk as estimated from the Gail model for the same population, provided that the Claus and the Gail models have the same accuracy in the prediction of the "true" risk. If our argument is valid. the prediction from the Claus model would indicate that the relationship between the mammographic features and the risk as estimated from the Claus model is closer to the relationship of the mammographic features with the "true" risk (observed risk) of developing breast cancer for the studied population. Thus, the better correlation of the selected mammographic features with the Claus model further confirms the correlation between the mammographic patterns characterized by the selected features and risk of developing breast cancer is not by chance.

Analysis of Mammographic Features in the Prediction of Risk

Age has been identified as the most important risk predictor in women. The evaluation of risk associated with the mammographic features, in addition to the risk associated with age, is important. The risk, however, from the mammographic features and the risk from age may overlap. At this point, we are only interested in analyzing the risk, in addition to aging, associated with mammographic parenchymal patterns.

Figure 9A:
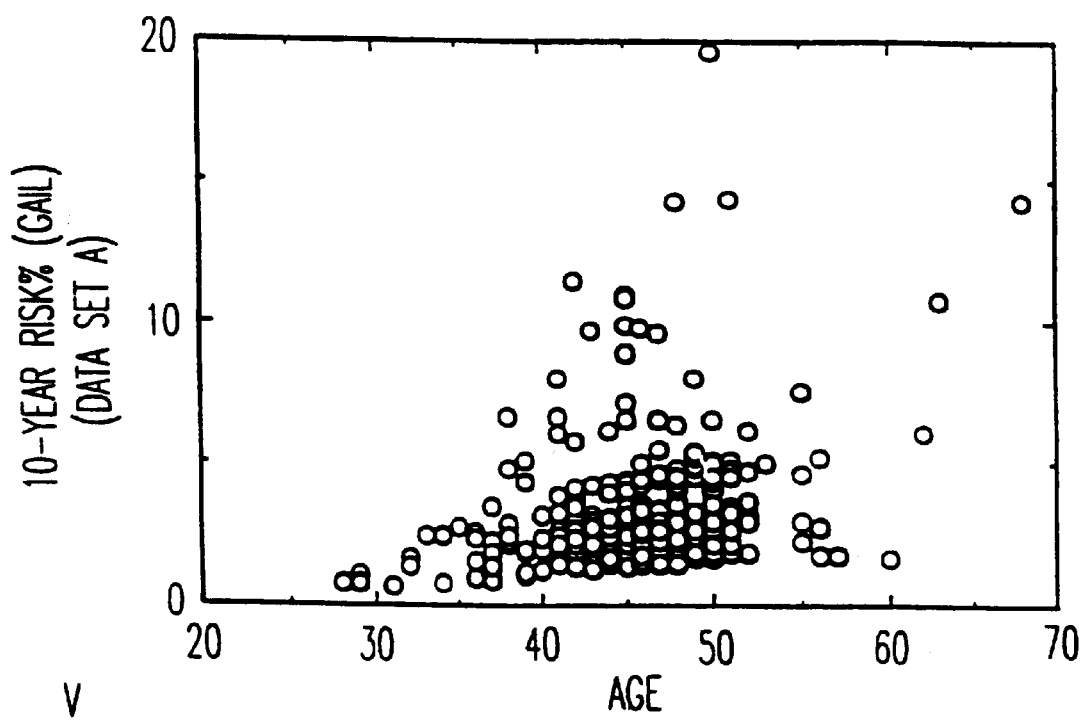
FIGS. 9a, 9b, 9c and 9d are graphs illustrating the relationship of the 10-year risk for the Gail and Claus models with age for different data sets.
Figure 9B:
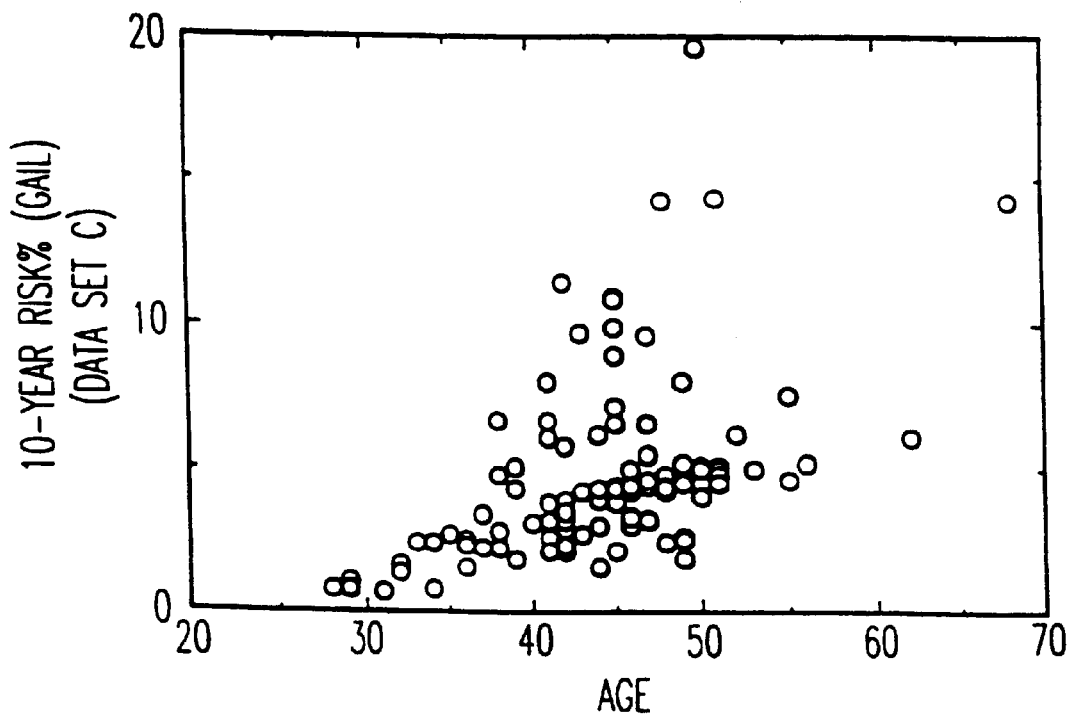
Figure 9C:
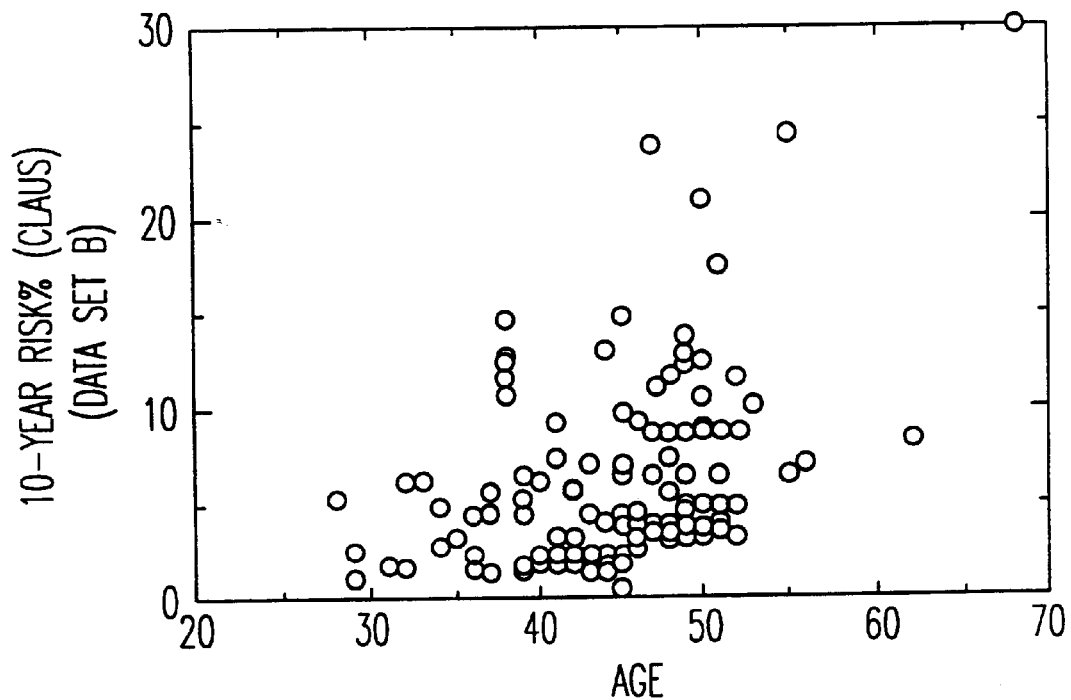
Figure 9D:
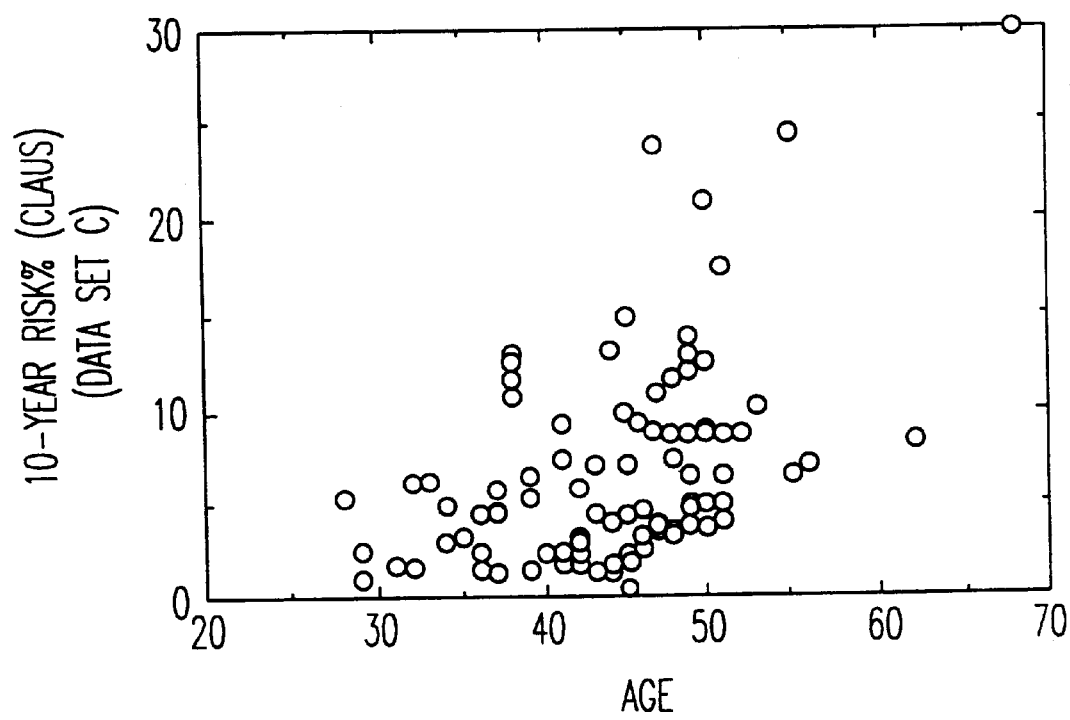

Since both the Gail and Claus models use age in their calculation of risk, we need to "rule out" the estimated risk associated with age in each model in order to evaluate the risk that is "explained" only by the mammographic features. The relationship as shown in FIG. 9 between the estimated risk and age is not explicitly expressed in either one of the two models. Thus, to "rule out" the contribution of age in the prediction of risk from each model, linear regression on age alone was first performed to evaluate the contribution of age, which is quantified by $R^2$, i.e., the proportion of the total variation in the risk that is "explained" by age. Furthermore, since a logarithmic relationship between the estimated risk and age may exist in FIGS. 9a and 9b, log transformation (log[risk %]) of the estimated risk was performed to better estimate the direct relationship between the estimated risk and age as shown in FIGS. 9a and 9b. A better estimate of the relationship between the estimated risk and age may assess better the contribution from the mammographic features to the risk.

TABLE 7

Goodness of fit ($R^2$) between risk as estimated from the Gail (or Claus) model and age with/without the selected mammographic features (Table 5.5) analyzed using the three different data sets. (For all models: $p < 0.0001$)

| | Goodness of fit (R2) Risk estimated from Gail model | | | | Goodness of fit (R2) Risk estimated from Claus model | | | |
|---|---|---|---|---|---|---|---|---|
| Data set | life-time | log life-time | 10 year | log 10 year | life-time | log life-time | 10 year | log 10 year |
| | $R^2$ on age only | | | | | | | |
| A | 0.06 | 0.09 | 0.08 | 0.14 | | | | |
| B | | | | | 0.05 | 0.05 | 0.16 | 0.16 |
| C | 0.02 | 0.02 | 0.24 | 0.41 | 0.04 | 0.03 | 0.22 | 0.20 |
| | $R^2$ on mammographic features with age | | | | | | | |
| A | 0.17 | 0.18 | 0.17 | 0.21 | | | | |
| B | | | | | 0.30 | 0.26 | 0.32 | 0.31 |
| C | 0.18 | 0.17 | 0.33 | 0.46 | 0.33 | 0.31 | 0.38 | 0.36 |

TABLE 8

Improvements in $R^2$ in terms of the difference in $R^2$ and the percent increase in comparison with the $R^2$ obtained from age in predicting the risk as estimated from the Gail or Claus model when mammographic features are used.

| | Improvement in R2 in predicting risk estimated from the Gail model | | | | Improvement in R2 in predicting risk estimated from the Claus model | | | |
|---|---|---|---|---|---|---|---|---|
| Data set | life-time | log life-time | 10 year | log 10 year | life-time | log life-time | 10 year | log 10 year |
| | Difference in $R^2$ | | | | | | | |
| A | 0.11 | 0.09 | 0.09 | 0.07 | | | | |
| B | 0.25 | 0.21 | 0.16 | 0.15 | | | | |
| C | 0.16 | 0.15 | 0.09 | 0.05 | 0.29 | 0.28 | 0.16 | 0.16 |

TABLE 8-continued

Improvements in $R^2$ in terms of the difference in $R^2$ and the percent increase in comparison with the $R^2$ obtained from age in predicting the risk as estimated from the Gail or Claus model when mammographic features are used.

| | Improvement in R2 in predicting risk estimated from the Gail model | | | | Improvement in R2 in predicting risk estimated from the Claus model | | | |
|---|---|---|---|---|---|---|---|---|
| Data set | life-time | log life-time | 10 year | log 10 year | life-time | log life-time | 10 year | log 10 year |
| | Percent increase in comparison with the $R^2$ from age | | | | | | | |
| A | 183% | 100% | 113% | 50% | | | | |
| B | | | | | 500% | 420% | 100% | 94% |
| C | 800% | 750% | 38% | 12% | 725% | 933% | 73% | 80% | that is additional to that from age. It should be noted that we also investigated a log transformation $$\left(\log\left[\frac{\text{risk}\%}{1 - \text{risk}\%}\right]\right)$$

of the risks as estimated from the Gail and the Claus models; however, the resulting $R^2$ values were the same as those obtained from the log transformation.

Both linear regression on age and linear regression of the transformed risk on age were performed for both the Gail and Claus models. As shown in Table 6, the $R^2$ values only between the 1 0-year risk estimated from the Gail model and from age (FIGS. 6a and 6b) were improved after the log transformation. Results in terms of $R^2$ (Table 6) show that age is a much stronger predictor for 10-year risk than for lifetime risk. The $R^2$ values were calculated for the three different data sets when the corresponding mammographic features (from Table Sa) selected from the linear regression models for each data set were included. They are listed in the same table for comparison. To quantitatively evaluate the contribution of mammographic features to the prediction of risk that is in addition to that from age, improvements in $R^2$ when the mammographic features were included were calculated in terms of the difference in $R^2$ and the percent increase in comparison with the $R^2$ from age. The improvements in $R^2$ are listed in Table 8.

As shown in Table 7, the inclusion of the mammographic features improves $R^2$ values in predicting the lifetime risk as estimated from both the Gail and Claus models. The $R^2$ values were improved by the amount ranging from 100% to 933% (listed in Table 8) of the $R^2$ values obtained when age was the only predictor. Since age is not important in predicting the lifetime risk, we concentrated our further analysis on the improvements in $R^2$ for the prediction of the 1 0-year risk.

The improvements in $R^2$ reflect the proportion of total variation in the risk explained by the mammographic features in addition to that by age. As shown in Table 8, the inclusion of the mammographic features improves $R^2$ by 113% and 38% of the $R^2$ obtained between the age and the 1 0-year risk from the Gail model on data set A and data set C, respectively. After the log transformation, the improvements in $R^2$ were reduced to 50% and 12%, respectively.

If the argument we made earlier is valid, that is the relationship between the mammographic features and the risk as estimated from the Claus model is closer to the relationship of the mammographic features with the "true"

risk (or the observed risk) of developing breast cancer for the studied population than that from the Gail model, the improvement in $R^2$ in predicting the 1 0-year risk as estimated from the Claus model should be more meaningful than that obtained from the Gail model. As shown in Table 8, the inclusion of the mammographic features improves $R^2$ by 100% and 73% of the $R^2$ values between the age and the 10-year risk from the Claus model on data set B and data set C, respectively. Thus, the improvement in $R^2$ (from the Claus model) shows that the mammographic features explained about the same proportion of total variation in the risk as that explained by age. Notice that improvements in $R^2$ in the Claus model were small after the log transformation was introduced.

Our comparison results showed that an important contribution is made by the inclusion of mammographic features in the prediction of 1 0-year risk. The comparison results lead us to conclude that the improvement in R2 due to the mammographic features in predicting the risk as estimated from the biological models is substantial.

It is important to investigate the direct relationship between the risk factors used in the model and the mammographic features in the prediction of risk as it may lead to an optimal combination of these risk factors and the mammographic features for a better prediction of breast cancer risk. This will be investigated in the future. Table 9 shows the correlation coefficients between the predicted risk from our computerized methods using mammographic features and/or age and the risk as estimated from the Gail or the Claus model for the 106 cases in data set C (see also Table 5). Note that such correlations are similar to those obtained between the Gail and the Claus models for the same data set (FIG. 9) and seen in the Nurse's Health Study (R=0.67). We believe that these results warrant a future large-scale study to further assess the benefit of using mammographic features to predict risk.

TABLE 9

Correlation coefficients between risk as estimated from the Gail or Claus model and risk from our computerized methods (LDA functions and ANNs) for data set C using three mammographic features and the age.

|  | Lifetime risk Gail model | 10-year risk Gail model | Lifetime risk Claus model | 10-year risk Claus model |
|---|---|---|---|---|
| Linear discriminant | 0.43(0.40*) | 0.57 | 0.57(0.56*) | 0.62 |
| ANN | 0.43(0.44*) | 0.60 | 0.61(0.61*) | 0.60 |

Note:
the numbers indicated by an asterisk were obtained using the three mammographic features without age.

Discussion and Summary

Prediction of breast cancer risk is a difficult problem. As shown in Table 1, many risk factors associated with breast cancer have been identified in large-scale epidemiologic studies [3]. Variation in the prediction of risk between the Gail and Claus models should not be unexpected. With age and family history (number of first-degree relatives with breast cancer) as the common risk factors in the two models, the correlation between the risk as estimated from the Gail and Claus models on the common subset (data set C) of the database yielded correlation coefficients of 0.61 and 0.60 for the 10-year risk and lifetime risk. respectively. The disagreement between the two most commonly used models when they were applied to our database accentuates the difficulty of predicting breast cancer risk. This disagreement may be partially attributed to differences between the populations used in the Gail and Claus studies and our database (data set C). Notably, a study on an independent database (the Nurses' Health Study) of 109,413 women showed that the correlation coefficient between the observed risk and the risk estimated from the Gail model was 0.67 [28]. The performance (Table 9) achieved by our computerized methods (LDA and ANN) using mammographic features and/or age in predicting breast cancer risk is comparable to that achieved by the Gail and the Claus models among themselves and other studies.

Due to the large variations between the two most commonly used clinical models (Gail and Claus) in the prediction of individual risk, both models were used as "truths" in our correlation analyses to establish the relationship between the mammographic patterns and breast cancer risk.

In our classification study, the number, 15, of BRCA1/BRCA2-mutation carriers is small. Since BRCA1/BRCA2-mutation carriers tend to develop breast cancer at a younger age, most of the mutation carriers had no mammograms prior to the diagnosis of breast cancer. It is likely that the results obtained on the limited number of mutation carriers are due to chance. However, we employed two different sets of features in the linear discriminant analysis in the task of differentiating between BRCA1/BRCA2-mutation carriers and the "low-risk" women. It should be noted that 143 "low-risk" women were included in the training besides the 15 mutation carriers. Linear discriminant analysis is rather reliable in projecting results obtained from a small database when the training database is small as compared with other statistical models, e.g., artificial neural networks.

Similar mammographic features (Tables 3 and 5) were identified from the two different analyses. The performance of these computer-extracted features in the two methods suggest that women who are at high risk tend to have dense breasts and their mammographic patterns tend to be coarse and low in contrast. Fourier analysis suggest that the texture patterns in the mammograms of the high risk women contain large components of low frequency and high radiographic density contents (low first moment of power spectrum and high RMS variation). These mammographic features suggest that increasing mammographic density and coarse texture indicate an increase in the risk of developing breast cancer.

In addition, it was shown that the risk associated with the computer-extracted features was substantial in comparison with the risk associated with age.

Our results from both analyses (classification and correlation analyses) indicate the potential usefulness of computerized analyses of mammographic images in the prediction of breast cancer risk.

Figure 10:
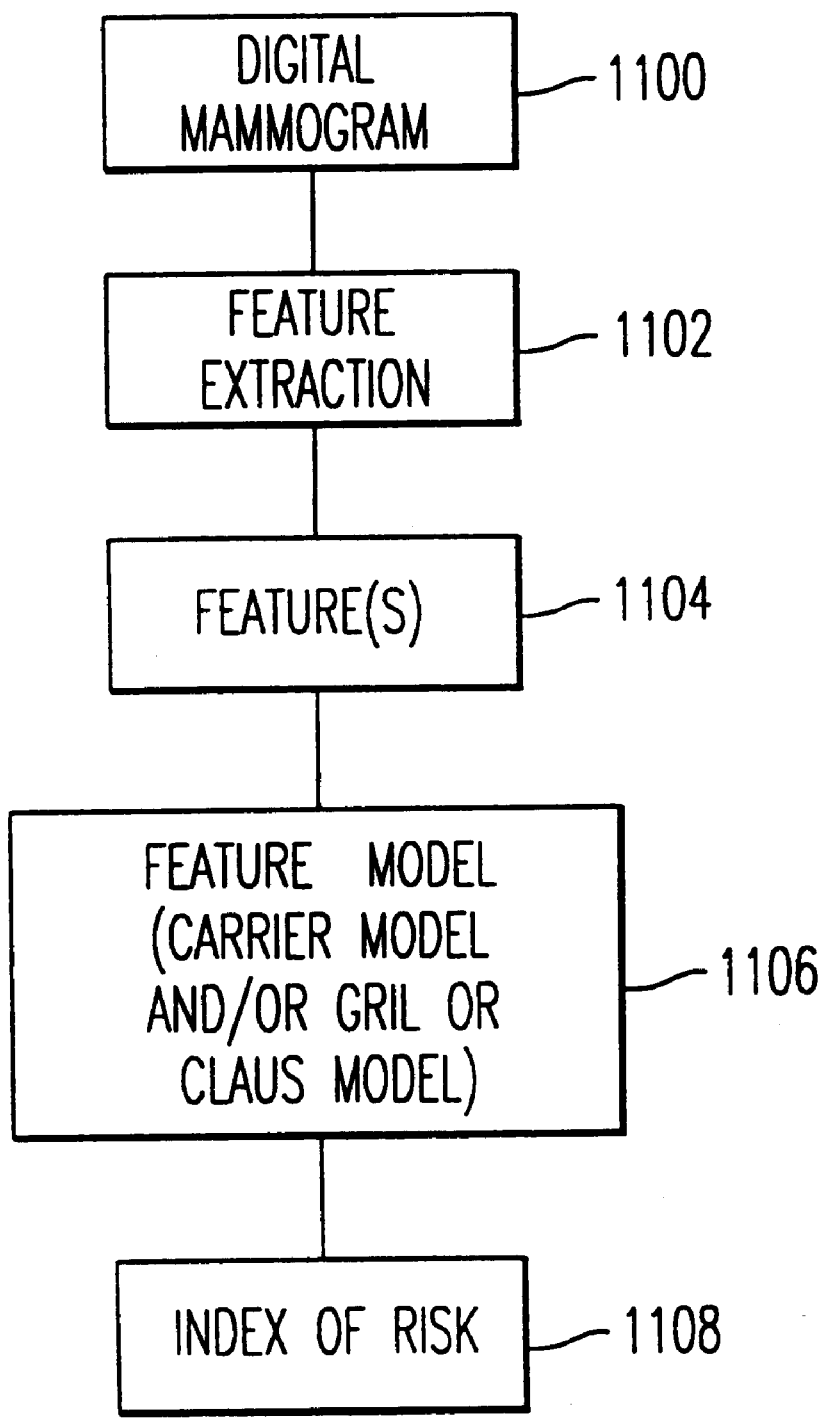
FIG. 10 is a schematic block diagram of a system for the computerized assessment of breast cancer risk from a digital mammogram image.

FIG. 10 is a block diagram illustrating an implementation of the present invention. In step 1100 a digital mammogram of a patient is obtained and a region of interest (ROI) in the mammogram determined. In step 1102, features are extracted from the ROI. In step 1104, one or more features extracted are applied to a predetermined model associating patterns of the extracted feature(s) with a risk estimate derived from corresponding feature patterns associated with gene carrier information (e.g., BRCA1/BRCA2) and clinical information (Gail or Claus model). In step 1106, extracted features are compared to the predetermined model, resulting in outputting in step 1108 of an index of risk.

Figure 11:
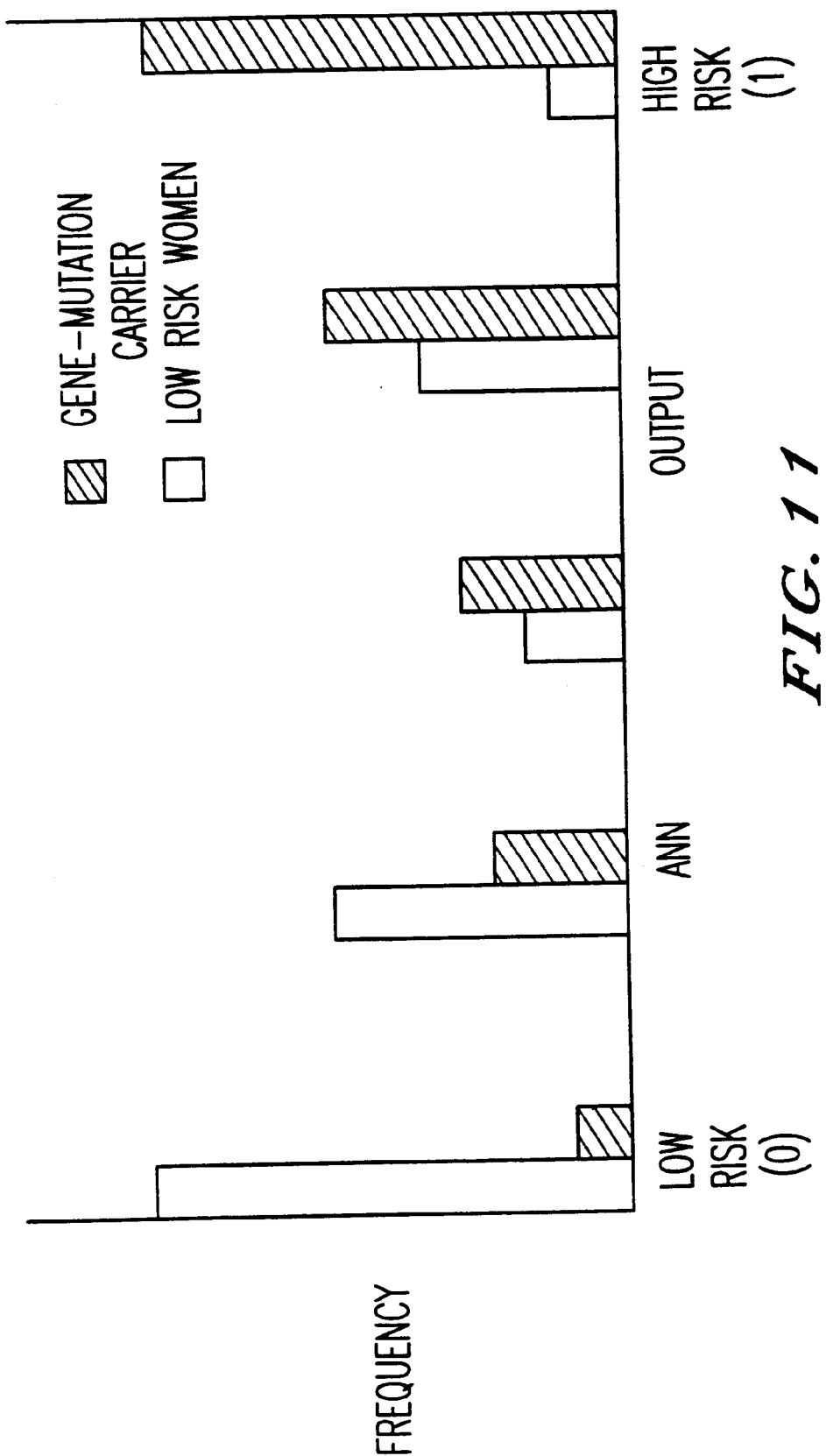
FIG. 11 is a bar graph showing the histogram of outputs from an artificial neural network (or a single feature) for high-risk and low-risk women.

FIG. 11 is a bar graph showing the histogram of outputs from an artificial neural network (or a single feature) for high-risk and low-risk women. At a particular cut-off on the ANN output, women above such a cut-off would be classified as high risk.

Figure 12:
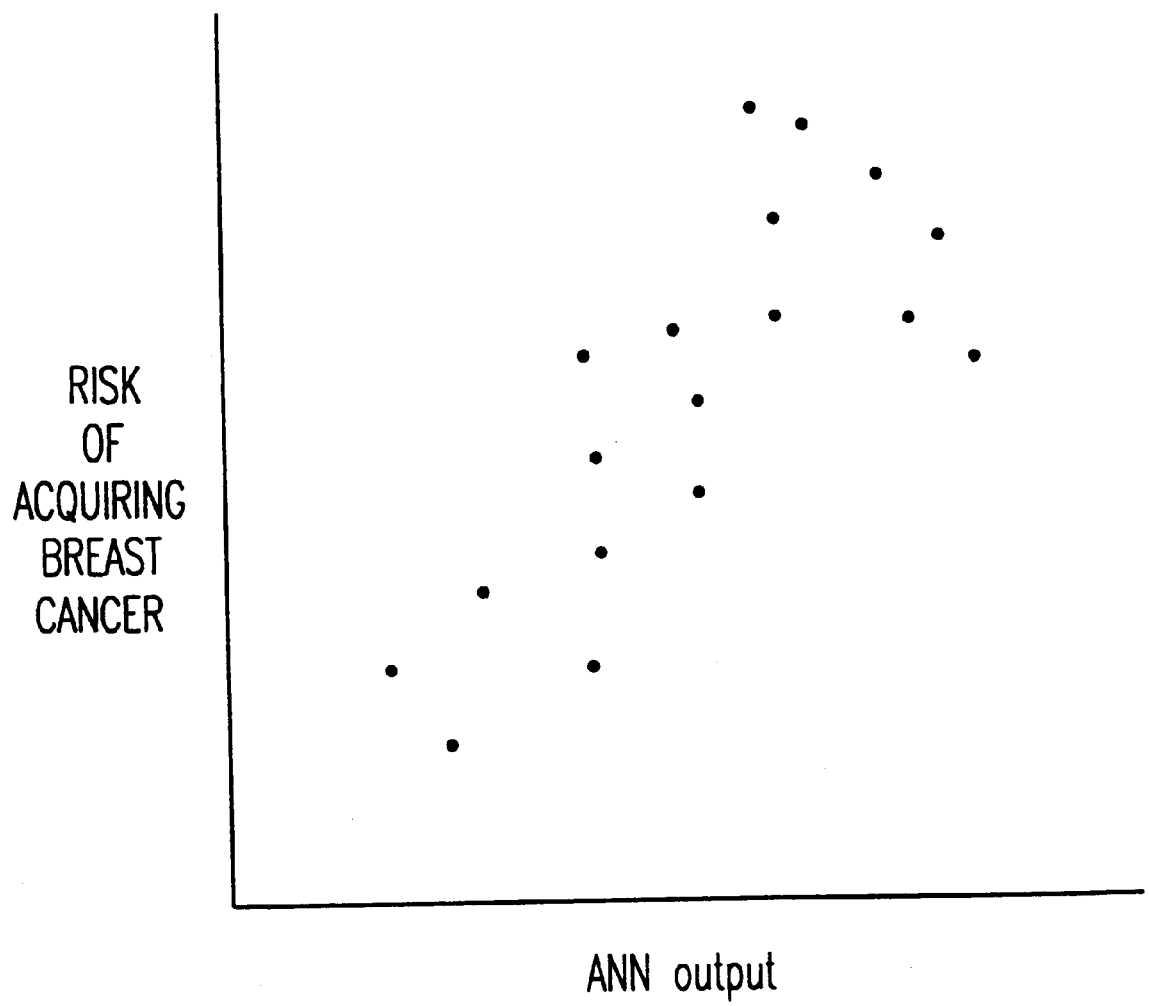
FIG. 12 is a graph showing the transformation from the artificial neural network output (or a single feature output) to the risk of cancer form a known population.
Figure 13:
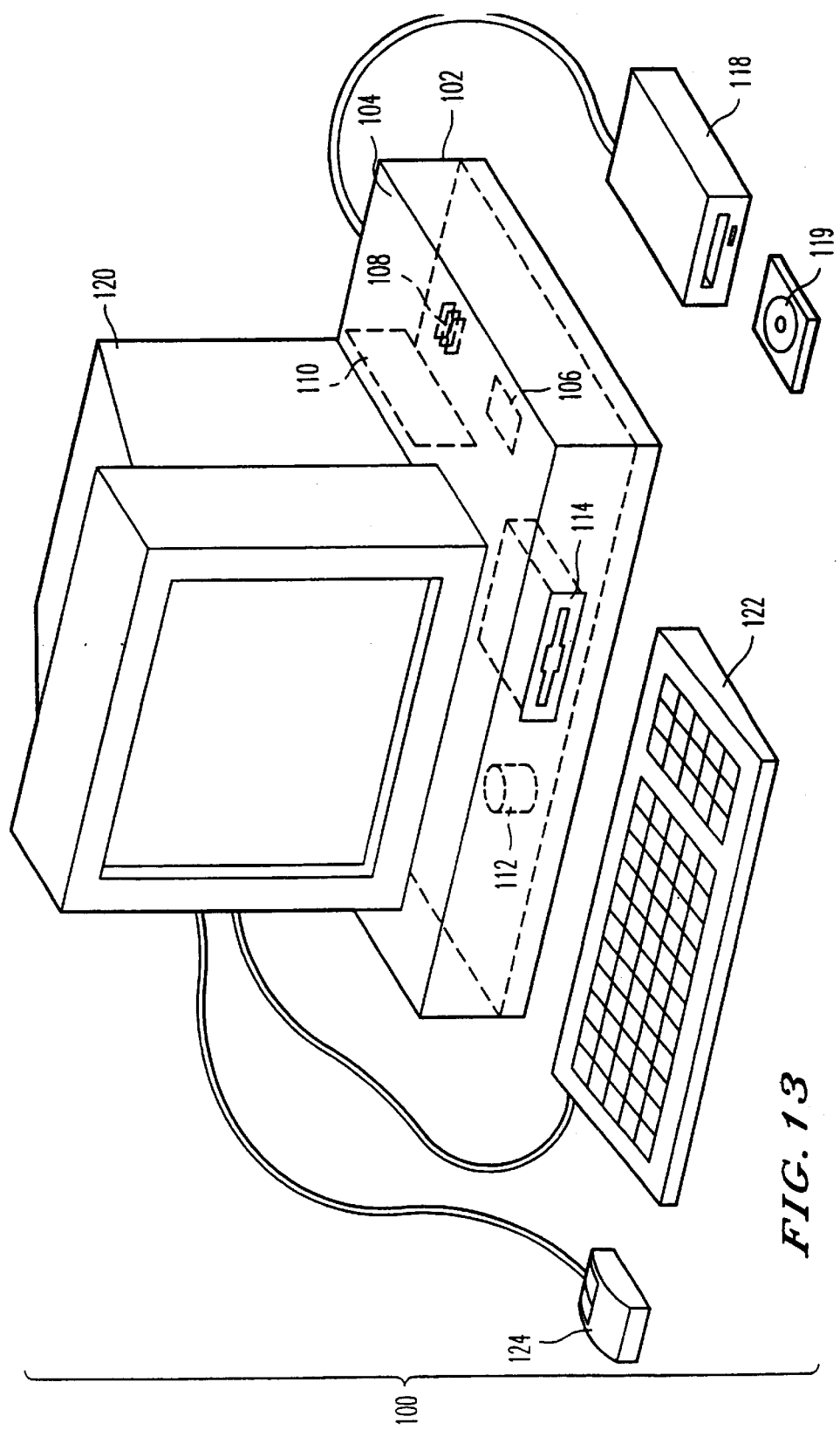
FIG. 13 is a schematic illustration of a general purpose computer 100 programmed according to the teachings of the present invention.

FIG. 12 is a graph showing the transformation from the artificial neural network output (or a single feature output) to the risk of cancer form a known population. Output from the ANN (or a single feature value) can be used to determine the estimated risk of cancer for a particular individual. The correlation (R) between the output of an artificial neural network (or a single feature) and risk of cancer is above exemplified for various single features and merged multiple features. (For example see Table 5).

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

FIG. 11 is a schematic illustration of a general purpose computer 100 programmed according to the teachings of the present invention. The general purpose computer 100 includes a computer housing 102 having a motherboard 104 which contains a CPU 106 and memory 108. The computer 100 also includes plural input devices, e.g., a keyboard 122 and mouse 124, and a display card 110 for controlling monitor 120. In addition, the computer system 100 further includes a floppy disk drive 114 and other removable media devices (e.g., tape, and removable magneto-optical media (not shown)), a hard disk 112, or other fixed, high density media drives, connected using an appropriate device bus, e.g., a SCSI bus or an Enhanced IDE bus. Also connected to the same device bus or another device bus, the computer 100 may additionally include a compact disc reader/writer 118 or a compact disc jukebox (not shown).

Stored on any one of the above described storage media (computer readable media), the present invention includes programming for controlling both the hardware of the computer 100 and for enabling the computer 100 to interact with a human user. Such programming may include, but is not limited to, software for implementation of device drivers, operating systems, and user applications. Such computer readable media further includes programming or software instructions to direct the general purpose computer 100 to perform tasks in accordance with the present invention.

The programming of general purpose computer 100 may include a software module for digitizing and storing PA radiographs obtained from an image acquisition device. Alternatively, it should be understood that the present invention can also be implemented to process digital data derived from a PA radiograph elsewhere.

The invention may also be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

APPENDIX

References

1. American Cancer Society. Cancer facts and Figures-1998. New York, N.Y. 1998; p. 20.
2. King M-C. Breast cancer genes: how many, where, and who are they? Nature Genet 1992; 2:250–290.
3. Gail M H and Benichou J. Assessing the risk of breast cancer in individuals. In DeVita V T, Hellman S and Rosenberg S A (eds): Cancer Prevention. Philadelphia. J. B. Lippincott, 1992;1–15.
4. Claus E B, Risch N and Thompson W D. Autosomal dominant inheritance of early-onset breast cancer: Implications for risk prediction. Cancer 1993; 73:643–65 1.
5. King M-C, Rowell S and Love S M. Inherited breast and ovarian cancer. JAMA 1993; 269:1975–1980.
6. Hall J M, Lee M K and Morrow J. Linkage of early-onset familial breast cancer to chromosome 17q21. Science 1990; 250:1684–1689.
7. Malkin D, Li F P and Strong L C. Germ line p53 mutations in a familial syndrome of breast cancer, sarcomas, and other neoplasms. Science 1990; 250:1233–1238.
8. Offit K. Clinical Cancer Genetics: Risk Counseling and Management. New York, Wiley-Liss, 1998.
9. Struewing J P, Hartge P, Wacholder S, Baker S M, Berlin M, McAdams M, Tinunerman M M, Brody L C and Tucher M A. The risk of cancer associated with specific mutations of BRCA1 and BRCA2 among ashkenazi jews. N Engl J Med 1997; 336:1401–1408.
10. Easton D F, Ford D and Bishop T D. Breast and ovarian cancer incidence in BRCA1-mutation carriers. Am J Hum Genet 1995; 56:256–271.
11. Newman B, Austin M A, Lee M and King M-C. Inheritance of human breast cancer: evidence for autosomal dominant transmission in high risk families. Proc Natl Acad Sci USA 1988; 85:3044–3048.
12. Claus E B, Risch N and Thompson W D. Genetic analysis of breast cancer in the cancer and steroid hormone study. Am J Hum Genet 199 1; 48:23 2–242.
13. Clark-Paul K C, Thomas R S and Ketcham A S. Estrogen and the breast. Surg Oncol Clin North 1993; 2:135–144.
14. Miller B A. The epidemiology of breast cancer. In Ames F C, Blumenschein G R and Montague E D (eds): Current Controversies in Breast Cancer. Austin, Tex. The University of Texas Press, 1984;
15. Kosary C L, Ries L A G, Miller B A, Harris A and Edwards B K. SEER cancer statistics review, 1973–1992: tables and graphs. Bethesda, Md., National Cancer Institute, 1995
16. Offit K and Brown K. Quantitation of familial cancer risk: a resource for clinical oncologists. J Clin Oncol 1994; 86:620–625.
17. Boyd N F, Byng J and Jong R. Quantitative classification of mammographic densities and breast cancer risk: results from the Canadian National Breast Screening Study. J Natl Cancer Inst 1995; 87:670–675.
18. Boyd N F, O'Sullivan B, Campbell J E, Fishell E, Simor I and Cooke G. Mammographic signs as risk factors for breast cancer. Br J Cancer 1982; 45:185–193.
19. Wolfe J N, Saftlas A F and Salane M. Mammographic parenchymal patterns and quantitative evaluation of 20. Brisson J, Morrison A S and Khalid N. Mammographic parenchymal features and breast cancer in the Breast Cancer Detection Demonstration Project. J Natl Cancer Inst 1980; 80:1534–1540.
21. Saftlas A F, Hoover R N, Brinton L A, Szklo M, Olson D R, Salane M and Wolfe J N.

Mammographic densities and risk of breast cancer. Cancer 1991; 67:2833–2838.

22. Byrne C, Schairer C, Wolfe J, Parekh N, Salane M, Brinton L A, Hoover R and Haile R. Mammographic features and breast cancer risk: effects with time. age, and menopause status. J Natl Cancer Inst 1995; 87:1622–1629.
23. Hoskins K F, Stopfer J E and Calzone K A. Assessment and counseling for women with a family history of breast cancer. JAMA 1995; 273:577–586.
24. Biesecker B B, Boehnke M, Calzone K, Markel D S, Garber J E, Collins F S and Weber B L. Genetic counseling for families with inherited susceptibility to breast and ovarian cancer. JAMA 1993; 269:19701974.
25. Gail M H, Brinton L A, Byar D P, Corle D K, Green S B, Schairer C and Mulvihill J J. Projecting individualized probabilities of developing breast cancer of white females who are being examined annually. J Natl Cancer Inst 1989; 81:1879–1886.
26. Gail M H and Benichou J. Epidemiology and biostatistics program of the national cancer institute. J Natl Cancer Inst 1994; 86:573–575.
27. Bondy M I L, Lustbader E D, Halabi S, Ross E and Vogel V G. Validation of a breast cancer risk assessment model in women with a positive family history. L Natl Cancer Inst 1994; 86:620–625.
28. Spiegelman D, Colditz G A, Hunter D and Hertzmark E. Validation of the Gail et al. model for predicting individual breast cancer risk. J Natl Cancer Inst 1989; 86:600–607.
29. Wolfe J. Breast patterns as an index of risk for developing breast cancer. Am J Roentgenol 1976; 126:1130–1139.
30. Warner E, Lockwood G, Math M, Tritchler D and Boyd N F. The risk of breast cancer associated with mammographic parenchymal patterns: a meta-analysis of the published literature to examine the effect of method of classification. Cancer Detection and Prevention 1992; 16:67–72.
31. Egan R L and Mosteller R C. Breast cancer mammography patterns. Cancer 1997; 40:2087–2090.
32. Boyd N F, O'Sullivan B and Fishell E. Mammographic patterns and breast cancer risk: methodological standards and contradictory results. J Natl Cancer Inst 1984; 72:1253–1259.
33. Oza A M and Boyd N E. Mammographic parenchymal patterns: a marker of breast cancer risk. Epidemiologic Rev 1993; 15:196–208.
34. Ma L, Fishell E and Wright B. Case-control study of factors associated with failure to detect breast cancer by mammography. J Natl Cancer Inst 1992; 84:781–785.
35. Whitehead J, Calile T and Kopecky K J. Wolfe mammographic parenchymal patterns: a study of the masking hypothesis of Egan and Mosteller. Cancer 1985; 56:1280–1286.
36. Boyd N F, O'Sullivan B O, Fishell E, Simor I and Cooke G. Mammographic patterns and breast cancer risk: methodological standards and contradictory results. J Natl Cancer Ints 1984; 72:1253–1259.
37. Magnin I E, Cluzeau F and Odet C L. Mammographic texture analysis: an evaluation of risk for developing breast cancer. Optical Engineering 1986; 25:780–784.
38. Caldwell C B, Stapleton S J, Holdsworth D W, Jong R A, Weiser W J, Cooke C and Yaffe M J. Characterization of mammographic parenchymal pattern by fractal dimension. Phys Med Biol 1990; 35:235–247.
39. Taylor P, Hajnal S, Dilhuydy M-H and Barreau B. Measuring image texture to separate "difficult" from "easy" mammograms. British J Rad 1994; 67:456–463.
40. Tahoces P, Correa J, Souto M, Gomes L and Vidal J. Computer-assisted diagnosis:

The classification of mammographic breast parenchymal patterns. Phys Med Biol 1995; 40:103–117.

41. Byng J W, Yaffe M J, Lockwood G A, Little L E, Tritchler D L and Boyed N F.

Automated analysis of mammographic densities and breast carcinoma risk. Cancer 1997; 88:66–74.

42. Byng J W, Boyd N F, Fishell E, Jong R and Yaffe M J. Automated analysis of mammographic densities. Phys Med Biol 1996; 1996:909–923.
43. Byng J, Boyd N, Fishell E, Jong R and Yaffe M. Automated analysis of mammographic densities. Phys Med Biol 1996; 1996:909–923.
44. Metz C E. ROC methodology in radiologic imaging. Invest Radiol 1986; 21:720–733.
45. Metz C E. Some practical issues of experimental design and data analysis in radiological ROC studies. Invest Radiol 1989; 24:234–245.
46. Metz C E, Wang P L and Kronman H B. A new approach for testing the significance of differences between ROC curves measured from correlated data. In Deconinck F (ed)Information Processing in Medical Imaging. Martinus Nijhoff, Boston, 1984; 432–445.
47. Haykin S. Neural Networks: A Comprehensive Foundation. New York, Macmillan College Publishing Company, 1994.
48. Jiang Y, Metz C E and Nishikawa R M. A receiver operating characteristics partial area index for highly sensitive diagnostic tests. Radiology 1996; 201:745–750.
49. Metz C E, Herman B A and Shen J. Maximum-likelihood estimation of receiver operating characteristic (ROC) curves from continuously-distributed data. Statistics in Medicine (in press).
50. Hays W L. Statistics. Philadelphia, Harcourt Brace College, 1994.
51. Byng J W. Boyed N F, Little L, Lockwood G, Fishell E, Jong R A and Yaffe M J. Symmetry of projection in the quantitative analysis of mammographic images. European Journal of cancer prevention 1996; 41:909–923.
52. Amadasum M and King R. Texture features corresponding to texture properties. IEEE Trans on System, Man and Cybernetics 1989, 19:1264–1274.
53. Jain A K. Fundamentals of Digital Image Processing. Englewood Cliffs, N.J., Prentice-Hall, 1986.
54. Katsuragawa S, Doi K, MacMahon H, Monnier-Cholley L, Ishida T and Kabayashi T. Classification of normal and abnormal lungs with interstitial disease by rule-based method and artificial neural networks. J Digit Imaging 1997; 10:108–114.

55. Caligiuri P, Giger M L, Favus M J, Jia H, Doi K and Dixon L B. Computerized radiographic analysis of osteoporosis: Preliminary evaluation. Radiology 1993; 186:471–474.

56. Johnson R A and Wichern D W. Applied Multivariate Statistical Analysis. Englewood Cliffs, New Jersey, Prentice-Hall, Inc., 1992.

57. Lachenbruch P L. Discriminant analysis. London, Hafner Press, 1975.

58. MINITAB reference Manual. State College, Pa., USA, Minitab Inc., 1995;

What is claimed as new and desired to be secured by Letters Patent of the United States is:

1. A method for the computerized assessment of breast cancer risk, comprising:

obtaining a digital image of a breast of a person:

determining values of plural parenchyma features of a breast region at a predetermined parenchymal location in said digital image, comprising, determining a value of a skewness feature based on gray-level histogram analysis of pixels within said predetermined parenchymal location, determining values of coarseness and contrast features based on a spatial relationship among gray levels of pixels within said predetermined parenchymal location, and determining a value of at least one of a balance feature based on gray-level histogram analysis of pixels in said predetermined parenchymal location, and a first moment of power spectrum feature based on Fourier analysis of pixel values within said predetermined parenchymal location;

comparing the determined values of the plural parenchyma features with a predetermined model associating values of the plural parenchyma features with a respective risk estimate; and outputting as a result of said comparing step a risk classification index indicating the likelihood of future onset of breast cancer.

2. The method of claim 1, further comprising:

obtaining at least one of gene carrier information and clinical information of the person; and said comparing step comprising comparing the obtained at least one of gene carrier information and clinical information and said determined values of the plural parenchyma featured with a predetermined model associating values of the at least one of gene carrier information and clinical information and values of said plural parenchyma features with a respective risk estimate.

3. The method according to claims 1 or 2, wherein:

said determining step comprises determining plural features related to at least one of an amount of dense pattern and texture of anatomic pattern in said predetermined parenchymal location.

4. The method according to claim 3, wherein:

said comparing step comprises performing at least one of classifier analysis, linear regression analysis and logistic regression analysis on at least one of 1) said plural determined features and 2) clinical information pertaining to the person from which the digital image was derived, in conjunction with said predetermined model.

5. The method according to claim 3, wherein said comparing step comprises:

merging selected features into a measure related to the risk of acquiring cancer.

6. The method according to claim 3, comprising:

obtaining gene carrier information of the person; and said comparing step comprising comparing the obtained gene carrier and said determined values of the plural parenchyma features with a predetermined model associating values of said gene carrier information and values of said plural parenchyma features with a respective risk estimate.

7. The method according to claim 3, comprising:

obtaining gene carrier information and clinical information of the person; and said comparing step comprising comparing the obtained gene carrier information and clinical information and said determined values of the plural parenchyma features with a predetermined model associating values of said gene carrier information, values of said clinical information and values of said plural parenchyma features with a respective risk estimate.

8. The method according to claim 4, further comprising:

relating the determined features to a likelihood of an individual having a gene mutation (biomarker).

9. The method of claim 4, wherein said classifier analysis comprises at least one of one of linear discriminant analysis and an artificial neural network.

10. The method according to claim 5, wherein said merging step comprises:

applying said selected features as inputs to a trained artificial neural network.

11. The method according to claims 1 or 2, wherein said determining step comprises:

determining the value of said balance feature within said predetermined parenchymal location.

12. The method according to claim 11, wherein said determining step comprises:

determining a value of a feature based on absolute values of gray levels of pixels in said predetermined parenchymal location.

13. The method according to claim 11, wherein said determining step comprises:

determining the value of said balance feature based on the following relationship:

value of balance=(70% CDF−AVE)/(AVE−30% CDF), where AVE=average gray level in a region of interest, 70% CDF=gray level yielding 70% of the area under the histogram of the region of interest, and 30% CDF= gray level yielding 30% of the area under the histogram of the region of interest.

14. The method according to claim 13, wherein:

said comparing step comprises performing at least one of classifier analysis, linear regression analysis and logistic regression analysis on said plural determined features and clinical information pertaining to the person from which the digital image was derived, including the person's age, in conjunction with said predetermined model.

15. The method according to claim 13, wherein:

said comparing step comprises performing at least one of classifier analysis, linear regression analysis and logistic regression analysis on said plural determined features and clinical information pertaining to the person from which the digital image was derived, including the person's age, in conjunction with said predetermined model.

16. The method of claim 14, wherein said classifier analysis comprises at least one of one of linear discriminant analysis and an artificial neural network.

17. The method of claim 15, wherein said classifier analysis comprises at least one of one of linear discriminant analysis and an artificial neural network.

18. The method according to claims 1 or 2, wherein said determining step comprises:
   determining the value of said first moment of power spectrum feature within said predetermined parenchymal location.

19. The method according to claim 18, wherein said determining step comprises:
   determining a value of a feature based on absolute values of gray levels of pixels in said predetermined parenchymal location.

20. The method according to claim 19, wherein:
   said comparing step comprises performing at least one of classifier analysis, linear regression analysis and logistic regression analysis on said plural extracted features and clinical information pertaining to the person from which the digital image was derived, including the person's age, in conjunction with said predetermined model.

21. The method of claim 20, wherein said classifier analysis comprises at least one of one of linear discriminant analysis and an artificial neural network.

22. The method of claim 1, wherein said determining step comprises:
   determining the values of the plural parenchyma features in a central breast region behind the breast nipple in said digital image.

23. A system for the computerized assessment of breast cancer risk, comprising:
   a mechanism configured to obtain a digital image of a breast of a person:
   a mechanism configured to determine valued of plural parenchyma features of a breast region at a predetermined parenchymal location in said digital image, comprising,
      a mechanism configured to determine a skewness feature based on gray-level histogram analysis of pixels within said predetermined parenchymal location,
      a mechanism configured to determine values of coarseness and contrast features based on a spatial relationship among gray levels of pixels within said predetermined parenchymal location, and
      a mechanism configured to determine a value of at least one of a balance feature based on gray-level histogram analysis of pixels in said predetermined parenchymal location,
   and a first moment of power spectrum feature based on Fourier analysis of pixel values within said predetermined parenchymal location;
      a mechanism configured to compare the determined values of the parenchyma features with a predetermined model associating values of the plural parenchyma features with a respective risk estimate; and
      a mechanism responsive to said compare mechanism and configured to output a risk classification index indicating the likelihood of future onset of breast cancer.

24. The system of claim 23, further comprising:
   a mechanism configured to obtain at least one of gene carrier information and clinical information of the person; and
   said compare mechanism configured to compare the obtained at least one of gene carrier information and clinical information and said determined valued of the plural parenchyma features with a predetermined model associating values of the at least one of gene carrier information and clinical information and values of said plural parenchyma features with a respective risk estimate.

25. The system according to claims 23 or 24, wherein:
   said determine mechanism mines plural features related to at least one of an amount of dense pattern and texture of anatomic pattern in said predetermined parenchymal location.

26. The system according to claim 25, wherein:
   said compare mechanism performs at least one of classifier analysis, linear regression analysis and logistic regression analysis on at least one of 1) said plural determined features and 2) clinical information pertaining to the person from which the digital image was derived, in conjunction with said predetermined model.

27. The system according to claim 25, wherein said compare mechanism comprises:
   a mechanism configured to merge selected features into a measure related to the risk of acquiring cancer.

28. The system according to claim 25, comprising:
   a mechanism configured to obtain gene carrier information of the person; and
   said compare mechanism configured to compare the obtained gene carrier information and said determined values of the plural parenchyma features with a predetermined model associating values of said gene carrier information and values of said plural parenchyma features with a respective risk estimate.

29. The system according to claim 25, comprising:
   a mechanism configured to obtain gene carrier information and clinical information of the person; and
   said compare mechanism configured to compare the obtained gene carrier information and clinical information and said determined values of the plural parenchyma features with a predetermined model associating values of said gene carrier information, values of said clinical information and values of said plural parenchyma features with a respective risk estimate.

30. The system according to claim 25, further comprising:
   a mechanism configured to relate the determined features to a likelihood of an individual having a gene mutation (biomarker).

31. The system of claim 26, wherein said classifier analysis comprises at least one of one of linear discriminant analysis and an artificial neural network.

32. The system according to claim 27, wherein said merge mechanism comprises:
   a mechanism configured to apply said selected features as inputs to a trained artificial neural network.

33. The system according to claims 23 or 24, wherein said determine mechanism determines the value said balance feature within said predetermined parenchymal location.

34. The system according to claim 33, wherein said determine mechanism determines a value of a feature based on absolute values of gray levels of pixels in said predetermined parenchymal location a feature based on Fourier analysis of pixel values in said predetermined parenchymal location.

35. The system according to claim 33, wherein said determine mechanism determines the value of said balance feature based on the following relationship:
   value of balance=(70% CDF−AVE)/(AVE−30% CDF),
   where AVE=average gray level in a region of interest, 70% CDF=gray level yielding 70% of the area under the histogram of the region of interest, and 30% CDF= gray level yielding 30% of the area under the histogram of the region of interest.

36. The system according to claim 34, wherein:
said compare mechanism performs at least one of classifier analysis, linear regression analysis and logistic regression analysis on said plural determined features and clinical information pertaining to the person from which the digital image was derived, including the person's age, in conjunction with said predetermined model.

37. The system according to claim 35, wherein:
said compare mechanism performs at least one of classifier analysis, linear regression analysis and logistic regression analysis on said plural determined features and clinical information pertaining to the person from which the digital image was derived, including the person's age, in conjunction with said predetermined model.

38. The system of claim 36, wherein said classifier analysis comprises at least one of one of linear discriminant analysis and an artificial neural network.

39. The system of claim 37, wherein said classifier analysis comprises at least one of one of linear discriminant analysis and an artificial neural network.

40. The system according to claim 23 or 24, wherein said determine mechanism determines the value said first moment of power spectrum feature within said predetermined parenchymal location.

41. The system according to claim 40, wherein said determine mechanism determines a feature based on absolute values of gray levels of pixels in said predetermined parenchymal location.

42. The system according to claim 41, wherein:
said compare mechanism performs at least one of classifier analysis, linear regression analysis and logistic regression analysis on said plural determined features and clinical information pertaining to the person from which the digital image was derived, including the person's age, in conjunction with said predetermined model.

43. The system of claim 42, wherein said classifier analysis comprises at least one of one of linear discriminant analysis and an artificial neural network.

44. The system of claim 23, wherein said determine mechanism is configured to determine the values of said plural parenchyma features in a central breast region behind the breast nipple in said digital image.

45. A computer readable medium storing computer instructions for computerized assessment of breast cancer risk, by performing the steps of:
obtaining a digital image of a breast of a person:
determining values of plural parenchyma features of a breast region at a predetermined parenchymal location in said digital image, comprising,
determining a value of a skewness feature based on gray-level histogram analysis of pixels within said predetermined parenchymal location,
determining values of coarseness and contrast features based on a spatial relationship among gray levels of pixels within said predetermined parenchymal location, and
determining a value of at least one of a balance feature based on gray-level histogram analysis of pixels in said predetermined parenchymal location, and a first moment of power spectrum feature based on Fourier analysis of pixel values within said predetermined parenchymal location;
comparing the determined values of the plural parenchyma features with a predetermined model associating values of the plural parenchyma features with a respective risk estimate; and
outputting as a result of said comparing step a risk classification index indicating the likelihood of future onset of breast cancer.

46. The computer readable medium of claim 45, storing further computer instructions of:
obtaining at least one of gene carrier information and clinical information of the person; and
said comparing step comprising comparing the obtained at least one of gene carrier information and clinical information and said determined values of the plural parenchyma features with a predetermined model associating values of the at least one of gene carrier information and clinical information and values of said plural parenchyma features with a respective risk estimate.

47. The computer readable medium of claims 45 or 46, wherein said determining step comprises:
determining plural features related to at least one of an amount of dense pattern and texture of anatomic pattern in said predetermined parenchymal location.

48. The computer readable medium of claim 47, wherein said comparing step comprises:
performing at least one of classifier analysis, linear regression analysis and logistic regression analysis on at least one of 1) said plural determined features and 2) clinical information pertaining to the person from which the digital image was derived, in conjunction with said predetermined model.

49. The computer readable medium of claim 47, wherein said comparing step comprises:
merging selected features into a measure related to the risk of acquiring cancer.

50. The computer readable medium according to claim 49, storing further computer instructions of:
obtaining gene carrier information of the person; and
said comparing step comprising comparing the obtained gene carrier and said determined values of the plural parenchyma features with a predetermined model associating values of said gene carrier information and values of said plural parenchyma features with a respective risk estimate.

51. The computer readable medium of claim 49, storing further computer instructions of:
obtaining gene carrier information and clinical information of the person; and
said comparing step comprising comparing the obtained gene carrier information and clinical information and said determined values of the plural parenchyma features with a predetermined model associating values of said gene carrier information, values of said clinical information and values of said plural parenchyma features with a respective risk estimate.

52. The computer readable medium of claim 47, further comprising:
relating the determined features to a likelihood of an individual having a gene mutation (biomarker).

53. The computer readable medium of claim 48, wherein said classifier analysis comprises at least one of one of linear discriminant analysis and an artificial neural network.

54. The computer readable medium of claim 49, wherein said merging step comprises:

applying said selected features as inputs to a trained artificial neural network.

55. The computer readable medium of claim 54, wherein said determining step comprises:

determining the value of said balance feature based on the following relationship:

value of balance=(70% CDF−AVE)/(AVE−30% CDF), where AVE=average gray level in a region of interest, 70% CDF gram level yielding 70% of the area under the histogram of the region of interest, and 30% CDF= gray level yielding 30% of the area under the histogram of the region of interest.

56. The computer readable medium of claim 55, wherein said comparing step comprises:

performing at least one of classifier analysis, linear regression analysis and logistic regression analysis on said plural determined features and clinical information pertaining to the person from which the digital image was derived, including the person's age, in conjunction with said predetermined model.

57. The computer readable medium of claim 56, wherein said classifier analysis comprises at least one of one of linear discriminant analysis and an artificial neural network.

58. The computer readable medium of claims 45 or 46, wherein said determining step comprises:

determining the value of said balance feature within said predetermined parenchymal location.

59. The computer readable medium of claims 45 or 46, wherein said determining step comprises:

determining the value of said first moment of power spectrum feature within said predetermined parenchymal location.

60. The computer readable medium of claim 58, wherein said determining step comprises:

determining a value of a feature based on absolute values of gray levels of pixels in said predetermined parenchymal location.

61. The computer readable medium of claim 59, wherein said determining step comprises:

determining a value of a feature based on absolute values of gray levels of pixels in said predetermined parenchymal location.

62. The computer readable medium of claim 60, wherein said comparing step comprises:

performing at least one of classifier analysis, linear regression analysis and logistic regression analysis on said plural determined features and clinical information pertaining to the person from which the digital image was derived, including the person's age, in conjunction with said predetermined model.

63. The computer readable medium of claim 61, wherein said comparing step comprises:

performing at least one of classifier analysis, linear regression analysis and logistic regression analysis on said plural determined features and clinical information pertaining to the person from which the digital image was derived, including the person's age, in conjunction with said predetermined model.

64. The computer readable medium of claim 62, wherein said classifier analysis comprises at least one of one of linear discriminant analysis and an artificial neural network.

65. The computer readable medium of claim 63, wherein said classifier analysis comprises at least one of one of linear discriminant analysis and an artificial neural network.

66. The computer readable medium of claim 45, wherein said determining step comprises:

determining the value of the plural parenchyma features in a central breast region behind the breast nipple in said digital image.

* * * * *